US005219947A

United States Patent [19]

Yasuda et al.

[11] Patent Number: 5,219,947

[45] Date of Patent: Jun. 15, 1993

[54] BINDER RESIN FOR A TONER FOR DEVELOPING ELECTROSTATIC IMAGES, AND PROCESS FOR PRODUCTION THEREOF

[75] Inventors: Satoshi Yasuda, Matsudo; Kiichiro Sakashita, Inagi; Yasuo Mitsuhashi; Seiichi Takagi, both of Yokohama; Shuichi Aita, Toride; Yoshinobu Nagai, Kohbe; Toshiaki Nakahara, Tokyo, all of Japan

[73] Assignee: Canon Kabushiki Kaisha, Tokyo, Japan

[21] Appl. No.: 514,516

[22] Filed: Apr. 23, 1990

Related U.S. Application Data

[60] Division of Ser. No. 275,599, Nov. 23, 1988, Pat. No. 4,966,829, which is a continuation of Ser. No. 94,389, Sep. 8, 1987, abandoned.

[30] Foreign Application Priority Data

| | | | |
|---|---|---|---|
| Sep. 8, 1986 | [JP] | Japan | 61-212179 |
| Mar. 12, 1987 | [JP] | Japan | 62-57358 |
| Mar. 12, 1987 | [JP] | Japan | 62-57359 |

[51] Int. Cl.$^5$ .......................... C08F 257/02; G03G 9/08

[52] U.S. Cl. .......................... 525/309; 525/265; 525/279; 525/285; 525/289; 525/308; 525/292; 525/302; 525/303; 525/267; 430/109

[58] Field of Search .......................... 525/265, 308, 309, 279, 525/285, 289, 292, 302, 303, 267; 430/109

[56] References Cited

U.S. PATENT DOCUMENTS

| | | | |
|---|---|---|---|
| 3,340,660 | 7/1982 | Kiuchi et al. . | |
| 4,481,274 | 11/1984 | Mitsuhashi et al. . | |
| 4,499,168 | 2/1985 | Mitsuhashi . | |
| 4,565,763 | 1/1986 | Uchiyama et al. . | |
| 4,626,488 | 12/1986 | Inoue . | |
| 4,968,574 | 11/1990 | Morita et al. | 430/111 |

FOREIGN PATENT DOCUMENTS

| | | |
|---|---|---|
| 41695/78 | 11/1978 | Australia . |
| 58763/80 | 5/1980 | Australia . |
| 3027121 | 2/1981 | Fed. Rep. of Germany . |
| 2563640 | 10/1985 | France . |
| 56-158340 | 12/1981 | Japan . |
| 58-86558 | 5/1983 | Japan . |
| 2078385 | 1/1982 | United Kingdom . |
| 2131565 | 6/1984 | United Kingdom . |

OTHER PUBLICATIONS

Translation of Japan 58-86558 (May 1983).

Patent Abstracts of Japan, vol. 7, No. 87 (P-190)[1232] Apr. 12, 1983, JP-A-58 14 147 (Konishiroku Shashin Kogyo K.K.) Jan. 26, 1983.

Patent Abstracts of Japan, vol. 7, No. 184 (P-216) [1329] Aug. 13, 1983, JP-A-58 86 558 (Nippon Carbide Kogyo K.K.) May 24, 1983.

Patent Abstracts of Japan, vol. 9, No. 170 (P-373) [1893] Jul. 16, 1985, JP-A-60 46 566 (Hitachi Kasei Kogyo K.K.) Mar. 13, 1985.

Patent Abstracts of Japan, vol. 9, No. 253 (P-395) [1976] Oct. 11, 1985, JP-A-60 104 956 (Canon K.K.) Jun. 10, 1985.

Japan Patent Abstract 2930550 from Japanese Laid-Open Appln. 56-158340 published Dec. 7, 1981.

*Primary Examiner*—James J. Seidleck
*Assistant Examiner*—Vasu S. Jagannathan
*Attorney, Agent, or Firm*—Fitzpatrick, Cella, Harper & Scinto

[57] ABSTRACT

A toner for developing electrostatic latent images with a good combination of fixability, anti-offset characteristic, anti-sticking characteristic and pulverizability is provided as a composition comprising a colorant or magnetic material and a binder resin. The binder resin has 0.1 to 60 wt. % of a chloroform-insoluble or a THF (tetrahydrofuran)insoluble and a THF-soluble, the THF-soluble providing a molecular weight distribution in the chromatogram of GPC (gel permeation chromatography) thereof such that there are a main peak in the molecular weight range of 1,000 to 25,000 and a sub-peak or shoulder in the molecular weight range of 2,000 to 150,000. The binder resin may suitably be obtained through two polymerization steps including a solution polymerization step and a suspension polymerization step.

13 Claims, 7 Drawing Sheets

BINDER RESIN FOR A TONER FOR DEVELOPING ELECTROSTATIC IMAGES, AND PROCESS FOR PRODUCTION THEREOF

This application is a division of allowed application Ser. No. 275,599 filed Nov. 23, 1988, now U.S. Pat. No. 4,996,829, which is a continuation of parent application Ser. No. 094,389 filed Sep. 8, 1987, now abandoned

FIELD OF THE INVENTION AND RELATED ART

This invention relates to a toner for developing electrostatic images in electrophotography, electrostatic recording, electrostatic printing, particularly to a toner for developing electrostatic images suitable for hot roller fixing obtained by a production process comprising pulverization, and further a binder resin for toner to be used in the toner, and a process for production of the resin.

In the prior art, a large number of electrophotographic processes have been known as described in U.S. Pat. No. 2,297,691, Japanese Patent Publication Nos. 23910/1967 and 24748/1968. Generally speaking, in these processes, electrical latent images are formed on a photosensitive member of photoconductive substance by various means and subsequently developed by use of a toner, and the toner image is optionally transferred onto a transfer material such as paper, and then fixed by heating, pressurization, heating and pressurization, or with solvent vapor to obtain copied products. Then, the toner remaining on the photosensitive member without transfer is cleaned by various methods, and the above steps are repeated.

In recent years, such copying apparatus are not only used as copying machines for office work for copying original manuscripts generally referred to, but they are also beginning to be used in the field of printers as output means of computers or personal copiers for personal use.

Accordingly, further miniaturization, further reduction in weight and higher speed, higher reliability have been severely pursued, and the machines are becoming to be constituted of simpler elements in various respects. Consequently, the performances demanded for toner have become severer, and more excellent machines are not practically feasible unless improvement in performance of toner can be accomplished.

For example, various methods and devices have been developed concerning the steps of fixing toner images onto sheets such as paper, and the most general method currently available is the pressure heating system by hot rollers.

The pressure heating system performs fixing by permitting the toner image surface on the sheet to pass between the surfaces of hot rollers having the surface formed of a material having release characteristic for the toner while under contact therewith under pressure. This method effects contact between the surfaces of the hot rollers and the toner image on the sheet for fixing under pressure, and therefore heat efficiency when the toner image sticks onto the sheet for fixing is very good, and fixing can be very rapidly effected so that it is very effectively applied to high speed electrophotographic copying machines. However, according to the above method, since the hot roller surfaces come into contact with the toner images under pressure under molten state, a part of the toner images may be attached and transferred onto the fixing roller surfaces, and the attached toner is then retransferred onto the next sheet to be fixed, whereby the so-called offset phenomenon may sometimes occur to contaminate the sheet to be fixed. One of the essential conditions for the hot roller fixing system has been accepted to prevent the hot fixing roller surface from attachment of toner.

In the prior art, for the purpose of preventing attachment of toner onto the fixing roller surface, it has been practiced, for example, to form the roller surface of a silicone rubber or fluorine-containing resin which is the material excellent in release characteristic for toner, and further to cover its surface with a thin film of a liquid having good release characteristic such as silicone oil for preventing offset and preventing fatigue of the roller surface. However, although this method is very effective in preventing offset, since a device for feeding a liquid for prevention of offset is necessary, there is a problem that the fixing device becomes complicated.

This is in a direction opposite to the requirement of miniaturization and reduction in weight, and moreover silicone oil may be evaporated to contaminate internally the machine is some cases. Accordingly, based on the thought to feed an anti-offset agent from inside of the toner during heating without use of a device for feeding silicone oil, it has been proposed to add a release agent such as low molecular weight polyethylene, low molecular weight polypropylene. When a large amount of such additive is added for exhibiting sufficient effect, however, filming onto a photosensitive member or contamination of a toner-carrying member such as carrier particles or sleeve may occur to deteriorate images, posing a practical problem. Accordingly, it has been practiced to add a small amount of a release agent into toner, and to use in combination a slight amount of a releasable oil or a device for cleaning the offset toner of the wind-up system, for example, by use of a member such as web.

However, in view of the recent demands such as miniaturization, reduction in weight, and higher reliability, it is necessary or preferable to remove even these auxiliary equipments. Therefore, it is impossible to cope with these problems without further improvement in performances such as fixability and anti-offset characteristic of toner, which cannot be realized so easily unless the binder resin for toner is further improved. Concerning the technique for improvement of the binder resin for toner, for example, Japanese Patent Publication No. 23354/1976 proposes a toner by using a crosslinked polymer as the binder resin. While this method has an effect of improving anti-offset characteristic and anti-winding characteristic, on the other hand, fixing point is elevated by increasing the degree of the crosslinking, and therefore no toner provided with sufficiently low fixing temperature, good anti-offset characteristic and anti-winding characteristic and sufficient fixability has been obtained. Generally speaking, for improvement in fixability, the binder resin must be lowered in molecular weight to lower the softening point, which is antagonistic to the measure for improvement of anti-offset characteristic, and lowering in melting point will necessarily result in lowering in transition point of the resin, whereby undesirable phenomenon may also occur that the toner during storage suffers from blocking.

In contrast, Japanese Laid-Open Patent Appln. JP-A 56-158340 proposes a toner comprising a lower molecular weight polymer and a higher molecular weight polymer, but it is difficult to have this binder resin contain a crosslinking component and, for improving anti-offset characteristic to a higher performance, it is necessary to make higher molecular weight of the higher molecular weight polymer, or increase its proportion. This approach leads to remarkably lower pulverizability, and it is difficult to obtain a practically satisfactory product. Further, concerning a toner comprising a low molecular weight polymer and a crosslinked polymer, for example, Japanese Laid-Open Patent Appln. JP-A 58-86558 proposes a toner comprising a lower molecular weight polymer and an infusible higher molecular weight polymer as the main resin components. According to this method, fixability and pulverizability tend to be improved, but because the weight-average molecular weight/number-average molecular weight (Mw/Mn) is as small as 3.5 or lower and the content of the insoluble and infusible higher molecular weight is so much as 40 to 90 wt.%, it is difficult to satisfy both of anti-offset characteristic and pulverizability, and practically it is extremely difficult to form a toner satisfying fixability (particularly, high speed fixing characteristic), anti-offset characteristic and pulverizability of the kneaded product for toner unless a fixer having a device for feeding a liquid for prevention of offset is used.

Further, if an insoluble and infusible higher molecular weight polymer is increased, the melt viscosity in thermal kneading during preparation of toner becomes very high, thermal kneading must be practiced at a temperature by far higher than in ordinary kneading, or at a high shear. Consequently, the former will result in lowering in toner characteristics by thermal deocmposition of other additives, while the latter will result in excessive cleavage of molecules of the binder resin, thus having a problem that the expected anti-offset performance cannot be exhibited readily.

Japanese Laid-Open Patent Appln. JP-A 50-166958 proposes a toner comprising a resin composition component obtained by polymerization in the presence of a low molecular weight poly-o-methylstyrene with a number average molecular weight (Mn) of 500 to 1,500. Particularly, in the above Patent publication, it is stated that the number-average molecular weight (Mn) in the range of 9,000 to 30,000 is preferable, but if Mn is increased for further improvement in anti-offset characteristic, fixability and pulverizability during toner preparation pose problems and it is difficult to satisfy anti-offset characteristic and pulverizability during toner preparation at high levels. A toner prepared by use of a resin composition with poor pulverizability during toner preparation is lowered in production efficiency during toner preparation, and toner particles with coarse particle sizes are liable to be entrained, whereby it may sometimes give undesirably scattered images in respect of a toner performance.

Japanese Laid-Open Patent Appln. JP-A 56-16144 (corres. to U.S. Pat. No. 4499168) proposes a toner containing a binder resin component having at least one maximum value in the regions of molecular weights of $10^3$ to $8\times10^4$ and $10^5$ to $2\times10^6$, respectively, in the molecular weight distribution obtained by GPC (gel permeation chromatography). In this case, although pulverizability, anti-offset characteristic, anti-filming or anti-sticking onto a photosensitive member and image quality are excellent, further improvement in anti-offset characteristic and fixability is demanded. Particularly, it is difficult for this resin to maintain various other performances with further improvement in fixability, or respond to the severe requirements of today while improving such performances.

Thus, it is extremely difficult to realize both fixing characteristic and pulverizability at high levels. Particularly, pulverizability of the kneaded product during toner preparation is an important factor in the trend of today to make smaller the particle size of toner from the demands of giving higher quality copied image, higher resolution and higher fine line reproducibility. Further, since the pulverization step requires enormous energy, improvement in pulverizability is also important in aspect of conservation of energy.

Sticking of toner onto inner walls of a pulverizing device is liable to be generated in a toner with good fixability, whereby pulverization efficiency becomes worse. Further, as another aspect, it is also necessary to pay attention to step of cleaning the toner remaining on the photosensitive member after transfer in other copying steps. Today, cleaning with blade (blade cleaning) is generally practiced in view of miniaturization, reduction in weight, and reliability. Along with prolonged life of photosensitive member, miniaturization of photosensitive drum, etc. and acceleration of speed of the system, anti-sticking and anti-filming characteristic onto a photosensitive member demanded for toner are becoming more severe. Particularly, amorphous silicon photosensitive members which have been practically applied recently are highly durable, and also OPC (organic photoconductor) is elongated in life, and accordingly various performances demanded for toner are becoming higher.

Miniaturization of a copying machine or a printer must be done by housing the respective elements in a narrow space. For this purpose, the space where air is allowed to pass becomes smaller, and also the fixer and heating source of exposure system are placed very close to the toner hopper and cleaner, whereby the toner is exposed to a high temperature atmosphere. Accordingly, a toner cannot be practically applied unless it has a further improved anti-blocking characteristic.

In view of examples as described above, requirements for a toner are severe, but the demands cannot be satisfied unless these can be improved at the same time. However, it is not meaningful at all to realize these, if image quality, durability of toner, developing characteristic, further production efficiency are lowered thereby.

These performances are greatly attributable to primarily the performances of the binder resin for toner. Although there are proposals to improve these by use of additives of release agents, plasticizers and others, these are subsidiary.

As shown in FIG. 7 of the accompanying drawing, various performances required for toner are antagonistic to each other in most cases, and yet it has been increasingly demanded to satisfy all of them at high levels.

SUMMARY OF THE INVENTION

An object of the present invention is to provide a toner which has solved the problems as described above.

Another object of the present invention is to provide a toner suitable for hot roller fixing system free from application of an oil.

Still another object of the present invention is to provide a toner which can be fixed at a low temperature and also is excellent in anti-offset characteristic.

Still another object of the present invention is to provide a toner which can be fixed at a low temperature and yet will not generate sticking or filming onto a photosensitive member even in a high speed system and use for a long term.

Still another object of the present invention is to provide a toner which can be fixed at low temperature, and yet is excellent in anti-blocking characteristic and particularly sufficiently useful in a high temperature atmosphere in a small machine.

Still another object of the present invention is to provide a toner which can be fixed at a low temperature and yet can be produced continuously with good efficiency due to no sticking of the pulverized product onto the inner walls of a pulverizing device in the pulverizing step during manufacture of the toner.

Still another object of the present invention is to provide a toner which is excellent in anti-offset characteristic and can be produced with good efficiency due to excellent pulverizability.

Still another object of the present invention is to provide a toner which is excellent in anti-offset characteristic, contains no more resin components insoluble in tetrahydrofuran (THF) than is necessary, and will not be denatured or deteriorated in the thermal kneading step of toner.

Still another object of the present invention is to provide a toner which is little in amount of coarse powder due to good pulverizability and therefore little in scattering of powder around image, and can form stable and good developed images.

Still another object of the present invention is to provide a binder resin for toner excellent in anti-sticking characteristic within the device during pulverization or anti-sticking characteristic onto a photosensitive member, and a process for production thereof.

Still another object of the present invention is to provide a binder for toner without any problem in developability, particularly image quality and durability, and a process for production thereof.

Still another object of the present invention is to provide a binder for toner satisfying excellent performances in various items at the same time, and a process for production thereof.

Still another object of the present invention is to provide a binder for toner which is excellent in fixing characteristic, and at the same in anti-offset characteristic, anti-winding characteristic and anti-blocking characteristic, and a process for production thereof.

Still another object of the present invention is to provide a binder for toner which is good in pulverizability and also good in production efficiency of toner, and a process for production thereof.

According to the present invention, there is provided a toner for developing an electrostatic latent image, comprising a colorant or magnetic powder and a binder resin, said binder resin having 0.1 to 60 wt.% of a chloroform-insoluble or a THF (tetrahydrofuran)insoluble and 40 to 99.9 wt.% of a THF-soluble, said THF-soluble having a molecular weight distribution in the chromatogram of GPC (gel permeation chromatography) thereof such that it has a main peak at a molecular weight of 1,000 to 25,000 and a sub-peak or shoulder at a molecular weight of 2,000 to 150,000.

According to another apsect of the present invention, there is provided a toner containing a vinyl polymer, comprising 0.1 to 60 wt.% of a chloroform-insoluble (gel component) and having, in the chromatogram by GPC of a THF-soluble, the main peak value at a molecular weight of 1,000 to 25,000 and at least one sub-peak or sub-shoulder at a molecular weight of 3,000 to 150,000.

According to still another aspect of the present invention, there is provided a toner for developing an electrostatic latent image, comprising at least a binder resin and a colorant or a magnetic material, said binder resin containing 10 to 60 wt.% (based on the binder resin) of THF-insolubles and THF-solubles having a molecular weight distribution such that it has a ratio of weight average molecular weight/number average molecular weight $(Mw/Mn) \geqq 5$, at least one peak in the region of molecular weights 2,000–10,000, and at least one peak or shoulder in the region of molecular weights 15,000–100,000, with the components of molecular weight 10,000 or lower being contained in an amount of 10 to 50 wt.% in the binder resin.

According to a further aspect of the present invention, there is provided a binder resin for toner having THF-insoluble and THF-soluble , comprising said 10 to 70 wt.% of said THF-insoluble, said THF soluble having a molecular weight distribution by GPC such that it has a ratio of weight average molecular weight/number average molecular weight $(Mw/Mn) \geqq 5$, at least one peak in the region of molecular weights 2,000–10,000, and at least one peak or shoulder in the region of molecular weights 15,000–100,000, with the components of molecular weight 10,000 or lower being contained in an amount of 10 to 50 wt.% based on the binder resin.

According to another aspect of the present invention, there is provided a process for production of a binder resin, which comprises forming a polymer having a molecular weight distribution by GPC such that it has the main peak in the region of molecular weights 2,000–10,000 and a ratio of weight average molecular weight/number average molecular weight $(Mw/Mn) \leqq 3.5$ and $Tg \geqq = 50°$ C. by solution polymerization and carrying out suspension polymerization reaction by dissolving said polymer in a polymerizable monomer to prepare a resin composition containing 10 to 70 wt.% of THF-insoluble, and THF-soluble having a molecular weight distribution such that it has a ratio $Mw/Mn \geqq 5$, at least one peak in the region of molecular weights 2,000–10,000, at least one peak or shoulder in the region of molecular weights 15,000–100,000 and the components of molecular weights of 10,000 or less at a ratio of 10 to 50 wt.% based on the whole resin.

DETAILED DESCRIPTION OF THE INVENTION

Figure 8:
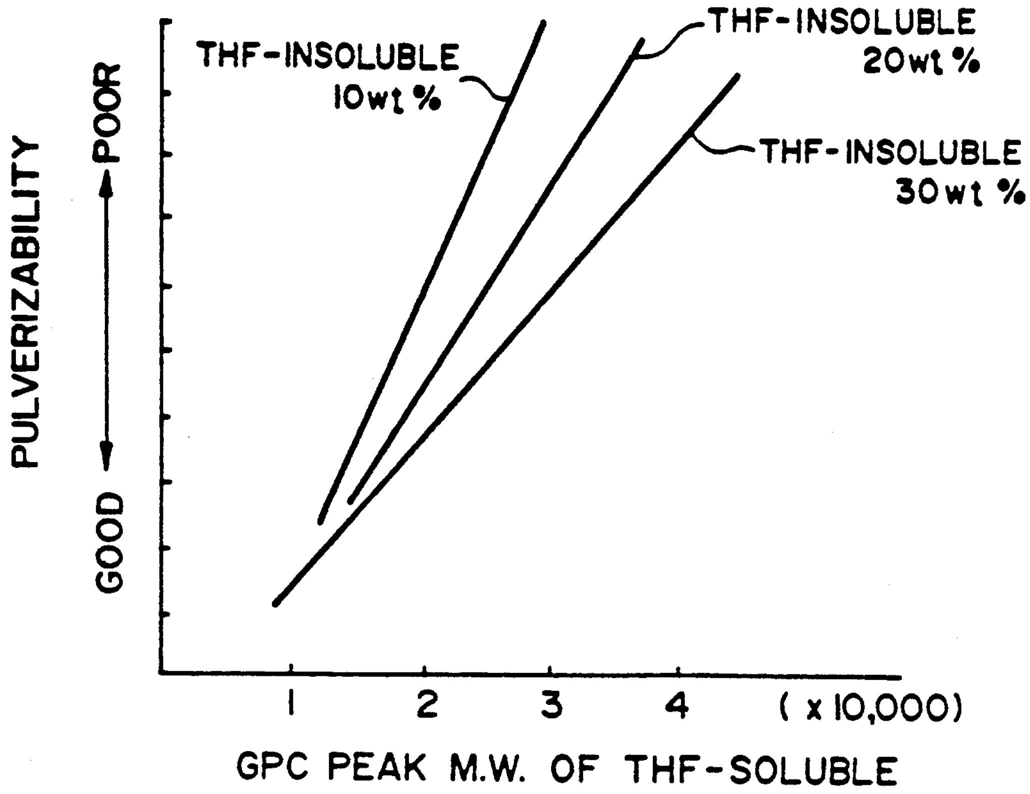
FIG. 8 shows a graph showing the relationship between the content of THF-insoluble and pulverizability.

In order to accomplish the objects as mentioned above at the same time, we have made an intensive study on compositions and performances of various binder resins from various viewpoints. As a consequence, it has been found that the above mentioned objects can be accomplished when the proportion of the THF-insoluble in the binder resin and the molecular distribution of THF-soluble satisfy specified conditions. When a binder resin is dissolved in a solvent such as chloroform or THF, it can be separated into an insoluble and a soluble, and the soluble can be subjected to measurement of the molecular weight distribution by GPC (gel permeation chromatography). To attract attention on the amount of THF-insoluble and the position of the main peak of the molecular weight distribution of THF-solubles, there is a relationship between the position and pulverizability as shown in FIG. 8. As a result, it can be seen that a system with no or little THF-insoluble is very disadvantageous, thus supporting the fact as mentioned above that the shifting of the position of the peak in the molecular weight distribution simply toward the position of lower molecular weight for the purpose of improving pulverizability will worsen anti-offset characteristic, whereby it is difficult to satisfy anti-offset characteristic and pulverizability in combination.

From this investigation, it has been found that it is very effective to incorporate a specific amount of THF-insoluble not only for the purpose of improving anti-offset characteristic as conventionally considered but also for the purpose of improving pulverizability during preparation of toner.

Figure 9:
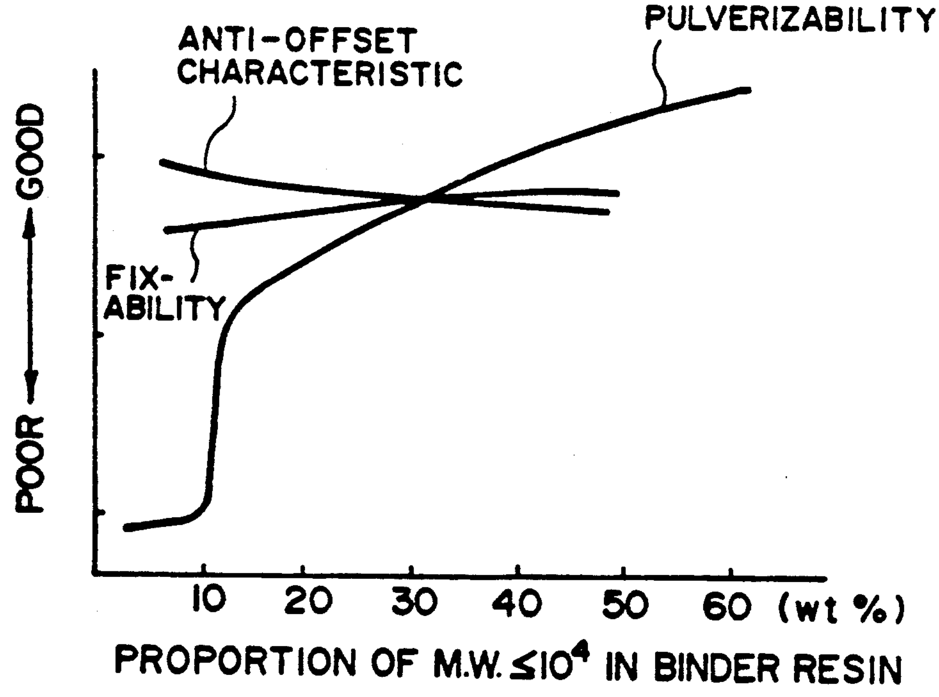
FIG. 9 shows a graph concerning the relationship between the content of the components of molecular weights of 10,000 or less and the toner characteristics.

Further, the molecular weight distribution of THF-soluble and the property as to whether the fixable temperature is high or low (hereinafter merely referred to as fixability), anti-offset characteristic, pulverizability and anti-blocking characteristic were investigated. As a result, for example, as shown in FIG. 9, it has been found that the components having molecular weights of about 10,000 or less and 10,000 or more in the GPC molecular weight distribution have different functions. It has been found that the proportion of the components having molecular weight of 10,000 or less based on the total binder resin will not remarkably influence fixability or anti-offset characteristic contrary to that conventionally mentioned, but it is substantially irrelevant if it is in a specific range above a certain value, and instead it strongly relates to pulverizability.

Further, from other investigations, it has been also found that in a binder resin system, the THF-soluble influences primarily anti-offset characteristic, anti-winding characteristic and pulverizability basically, and that the components of molecular weights of 10,000 or less of THF-soluble influence primarily pulverizability, anti-blocking characteristic, anti-sticking or anti-filming characteristic onto a photosensitive member and sticking onto the inner walls of a pulverizer, and further that the amount of the components of molecular weights of 10,000 or more of THF-soluble influence primarily fixability. As a result, the proportion of the components of molecular weights of 10,000 or less may preferably be 10 to 50 wt.%, particularly 10 to 39 wt.%. For exhibiting sufficient performances, it is further required that the distribution should have a peak in the region of molecular weight of 2,000 to 10,000 (preferably 2,000–8,000) and a peak or a shoulder in the region of molecular weight of 15,000 to 100,000 (preferably 20,000–70,000). If there is no peak in the range of 2000–10000 and there is a peak at 2,000 or less, but the proportion of the components of molecular weight 10,000 or less is 50 wt.% or more, some problems may be caused in anti-blocking characteristic, anti-sticking or anti-filming characteristic onto a photosensitive member, or sticking onto inner walls of a pulverizer. If there is no peak at 10,000 or less, and there is a peak at 10,000 or more while the proportion of the components of molecular weight 10,000 or less is 10 wt.% or less, there is posed a problem particularly with respect to pulverizability, and also formation of coarse particles may pose a problem.

If there is no peak or shoulder in the region of molecular weight 15,000 or more and there is only a peak in the region of molecular weight 15,000 or less, anti-offset characteristic will pose a problem. If there is no peak or shoulder in the region of molecular weight 15,000–100,000, and there is the main peak at 100,000 or higher, pulverizability will pose a problem.

Further, the THF-soluble is required to satisfy the relationship of $Mw/Mn \geqq 5$, and if Mw/Mn is lower than 5, anti-offset characteristic tends to be lowered and problematic.

Preferably, Mw/Mn may be 80 or less, more preferably satisfy the relation of $10 \leqq Mw/Mn \leqq 60$.

Particularly, when Mw/Mn is $10 \leqq Mw/Mn—60$, especially excellent performances can be exhibited in various characteristics such as pulverizability, fixability, anti-offset characteristic, image quality, etc.

Here, Mw is weight-average molecular weight measured by GPC as described below, and Mn is number-average molecular weight by the same measurement.

The content of chloroform-insoluble or THF-insoluble in the binder resin for toner is 0.1 to 60 wt.%. If it is less than 0.1 wt.%, anti-offset characteristic becomes a problem, while at a content over 60 wt.%, thermal fixing temperature tends to be elevated.

The content of chloroform-insoluble or THF-insoluble in the binder resin for toner may be preferably 10 to 60 wt.%. At a level lower than 10 wt.%, anti-offset characteristic can be insufficient in some cases. More preferably, the content of chloroform-insoluble THF-insoluble may be 10 to 50 wt.%. Further preferably, the range of 15 to 49 wt.% is preferable in view of pulverizability and anti-offset characteristic.

The content of chloroform-insoluble or THF-insoluble is required to be controlled in view of the THF-soluble content, the peak position in GPC chromatogram of THF-soluble and cleavage of polymer molecular chains during thermal kneading.

According to another consideration, the proportion of THF-insoluble in the resin for toner is preferably 10 to 70 wt.% (particularly 10 to 60 wt.%). If THF-insoluble is less than 10 wt.%, anti-offset characteristic and anti-winding characteristic may become problematic, while at higher than 70 wt.%, the problem of deterioration due to cleavage of molecular chains during thermal kneading for preparation of toner may occur. Preferably, the range of 15 to 59 wt.% (more preferably 15 to 49 wt.%) may be used.

When the glass transition point $Tg_1$ of the resin of the molecular weight components of 10,000 or less in the THF-soluble is compared with the $Tg_t$ of the whole resin, if the relationship of $(Tg_1) \geqq (Tg_t - 5)$ is satisfied, fixability, pulverizability, anti-sticking, anti-filming characteristic onto a photosensitive member, inhibition of sticking on inner walls of a pulverizer, and anti-blocking characteristic will become better.

$Tg_1$ as herein mentioned is measured by the following method. Under THF flow at a rate of 7 ml/min. at 25° C., a sample solution in THF with a concentration of about 3 mg/ml of THF-soluble in toner is injected in an amount of about 3 ml into a molecular weight distribution measuring apparatus, and the components of molecular weights of 10,000 or less are separated and collected. After collection, the solvent is evaporated under reduced pressure and further dried in an atmosphere of 90° C. under reduced pressure for 24 hours. The above operation is repeated until about 20 mg of the components with molecular weights of 10,000 or less is obtained. The obtained sample is subjected to annealing at 50° C. for 48 hours, and thereafter Tg is measured by differential scanning calorimetry, and the measured value is defined as $Tg_1$.

As the column for separation, TSKgel, G2000H, TSKgel G2500H, TSKgel G3000H, TSKgel G4000H (produced by Toyo Soda Kogyo K.K.) may be employed, but in the Examples of the present invention described hereinafter, TSKgel G2000H and TSKgel G3000H were employed in combination.

The value of $Tg_t$ which is the Tg of a toner, is determined by differential scanning calorimetry after subjecting the toner to annealing at 50° C. for 48 hours.

Figure 1:
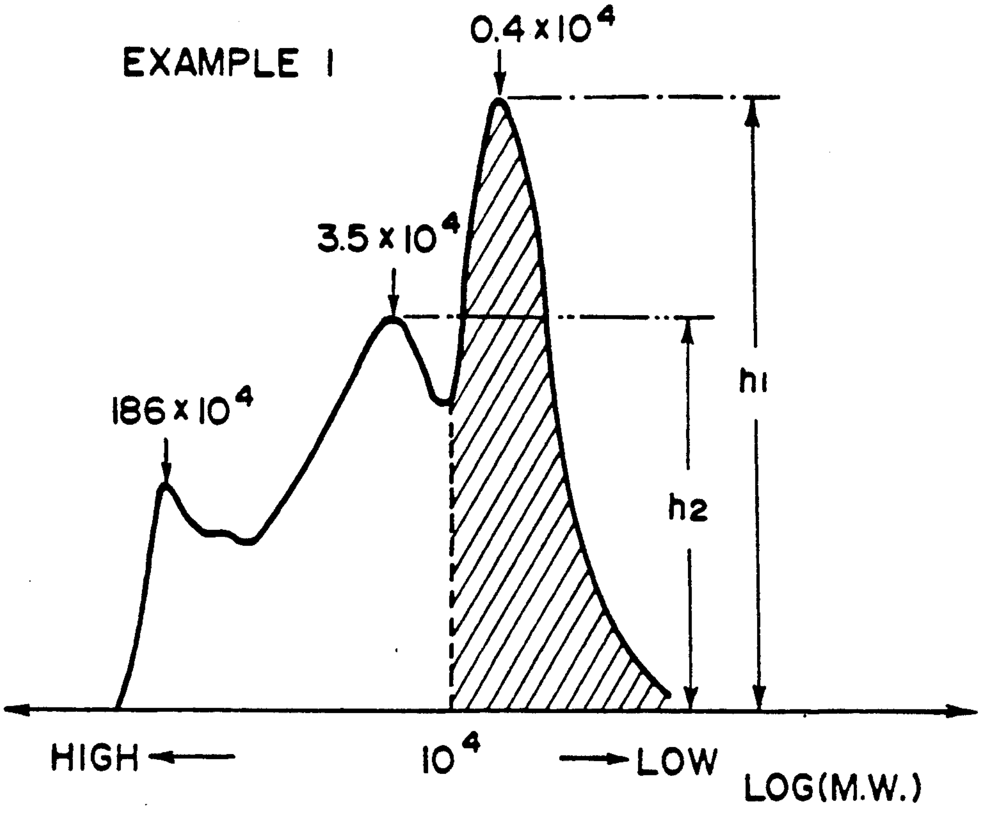
FIG. 1 shows a GPC chromatogram of the THF-soluble of the toner of Example 1.

According to a most preferred embodiment of the present invention, there is provided a toner containing a binder resin, having a ratio of $h_1/h_2$ of 0.4/1 to 4.0/1, when the height of the highest peak in the region of molecular weight of 15,000 to 100,000 is denoted by $h_2$ and the height of the highest peak in the region of molecular weight of 2,000 to 10,000 is denoted by $h_1$ in the GPC molecular weight distribution of THF-soluble, as shown in FIG. 1. Further, the number-average molecular weight of THF-soluble may be preferably $2{,}000 \leqq Mn \leqq 9{,}000$. If $Mn < 2{,}000$, anti-offset characteristic becomes problematic, while if $9{,}000 < Mn$, pulverizability and fixability will become problematic.

The chloroform-insoluble (gel component) or THF-insoluble in the present invention represents a weight ratio of the polymer components (substantially crosslinked polymer) which have become insoluble in chloroform or THF solvent in the resin composition in the toner, and can be used as a parameter indicating the extent of crosslinking of a resin composition containing crosslinked components. The chloroform-insoluble or THF-insoluble is defined by the value measured as described below.

A toner sample is weighed in an amount of 0.5 to 1.0 g ($W_1$ g), placed in a cylindrical filter paper (e.g. No. 86 R, produced by Toyo Roshi K.K.) and subjected to a Soxhlet's extractor to effect extraction with the use of 100 to 200 ml of chloroform or THF as the solvent for 6 hours. The soluble extracted with the solvent is subjected to evaporation, and then vacuum-dried at 100° C. for several hours, and the amount of the chloroform- or THF-soluble resin component is weighed ($W_2$ g). The weight of the components other the resin component such as magnetic material or pigment in the toner is defined as ($W_3$ g). The chloroform- or THF-insoluble is defined from the following formula:

$$\text{Chloroform- or THF-insoluble (\%)} = \frac{W1 - (W3 + W2)}{(W1 - W3)} \times 100$$

In the present invention, the molecular weight of a peak or/and a shoulder in a chromatogram by GPC (gel permeation chromatography), may be measured under the following conditions.

Through a column stabilized in a heat chamber at 40° C., THF (tetrahydrofuran) as the solvent is permitted to flow at a rate of 1 ml/min., and 50 to 200 μl of a THF sample solution of a resin controlled to a sample concentration of 0.05 to 0.6 wt.% is injected for measurement. In measuring the molecular weight of the sample, the molecular weight distribution possessed by the sample is calculated based on a calibration curve prepared from several kinds of mono-dispersed polystyrene standard samples showing a relationship between the logarithmic value of the molecular weights and the count numbers. As the standard polystyrene samples for preparation of the calibration curve, for example, those produced by Pressure Chemical Co. or Toyo Soda Kogyo K.K., having molecular weights of $6\times10^2$, $2.1\times10^3$, $4\times10^3$, $1.75\times10^4$, $5.1\times10^4$, $1.1\times10^5$, $3.9\times10^5$, $8.6\times10^5$, $2\times10^6$, $4.48\times10^6$ may be employed, and it is suitable to use at least 10 points of standard polystyrene samples. As the detector, an RI (refractive index) detector is used.

As the column, for measuring adequately a molecular region of $10^3-2\times10^6$, a plurality of commercially available polystyrene gel columns may be preferably combined. For example, a combination of μ-styragel 500, $10^3$, $10^4$ and $10^5$ produced by Waters Co., a combination of Shodex KF-80M, KF-802, 803, 804 and 805 produced by Showa Denko K.K., or a combination of TSKgel G1000H, G2000H, G2500H, G3000H, G4000H, G5000H, G6000H, G7000H and GMD produced by Toyo Soda K.K., are preferred.

The weight % of the components of molecular weights 10,000 or lower relative to the binder resin is determined by cutting out the portion of chromatogram corresponding to the components of molecular weights of 10,000 or less, calculating the weight ratio relative to the portion of chromatogram cut out corresponding to the components of 10,000 or more, and calculating the weight % relative to the whole resin by use of the weight % of the above THF insoluble.

The above binder resin characterized by the parameters may occupy 60 wt.% or more, preferably 80 wt.% or more, particularly preferably 90 wt.% or more of the total amount of binder resin in the toner of the present invention.

Further, in the above molecular weight distribution of GPC, when the chromatogram is divided into three portions with the molecular weights $3\times10^4$ and $50\times10^4$ as the boundaries, namely into a component A (region of $50\times10^4$ or higher), a component B (region of $3\times10^4$ to $50\times10^4$) and a component C (region of $3\times10^4$ or lower), respectively, from the higher molecular weight side, and the constituent ratios of the respective regions relative to the whole chromatogram are determined from integrated values of the chromatogram or by the weight from the respective weights of the chromatogram cut out into three portions, the constituent ratios may be 0 to 20%, preferably 0 to 15%, more preferably 0 to 10%, furthermore preferably 1-9%, for the component A; 10 to 60%, preferably 15 to 55%, more preferably 20 to 50% for the component B; and 20 to 90%, preferably 35 to 80%, more preferably 40 to 70% for the component C.

The reason for these is because, in a relationship between the chloroform- or THF-soluble and the chloroform- or THF-insoluble, a resin composition with a gel component of 60% or higher will bring about elevation in fixing temperature and further invite poor dispersibility of the additive when used for toner, due to the melting characteristic of the cross-linked components. Further, cleavage of the highly crosslinked components will readily occur during kneading of the resin, thereby causing troubles in designing of toner. When the gel component is less than 0.1%, offset, winding around rollers will readily occur, and further when the gel component is less than 0.1% and the content of the higher molecular region is high, pulverizability will be remarkably worsened.

If the molecular weights of the solvent soluble have no main peak value in the range of 1,000 to 25,000, and the main peak value is at 25,000 or higher, the fixing temperature of the toner prepared will be elevated to narrow the fixing temperature region, and also the pulverizability is worsened to bring about lowering in production efficiency. If the molecular weight of the main peak value is lower than 1,000, the toner prepared will be remarkably worsened in anti-offset characteristic or anti-winding characteristic around rollers, and further a problem may sometimes occur in blocking. If there is no sub-peak or subshoulder in the molecular weight range of 3,000 to 150,000, and their values are higher than 150,000, dispersibility of additive is poor, and also fixing temperature is remarkably elevated, with pulverizability being further remarkably worsened. If the molecular weight for a sub-peak or sub-shoulder is less than 3,000, the toner prepared is worsened in anti-offset characteristic, anti-winding characteristic around rollers, and further a problem may sometimes occur in blocking. In the toner of the present invention, the above problems are markedly improved, and a toner with excellent anti-offset characteristic, anti-winding characteristic around rollers, broad fixing temperature region and yet with excellent developing characteristics and good pulverizability can be obtained.

It is further preferred that the binder resin contains 10-50 wt.% of the chloroform-insoluble, and the THF-soluble of the binder resin has, in the GPC chromatogram thereof, a main peak in the molecular weight range of 2,000 to 15,000 and a sub-peak or shoulder in the molecular weight range of 8,000 to 80,000.

The resin composition in the toner of the present invention may be preferably polymers or copolymers obtained by polymerization of at least one monomer selected from styrene type monomers, acrylic acid type monomers, methacrylic acid type monomers and derivatives thereof for developing characteristics and charging characteristics. Examples of the monomers may include styrene type monomers such as styrene, α-methylstyrene, vinyltoluene, chlorostyrene and the like; acrylic acid type monomers, methacrylic acid type monomers and derivatives thereof such as acrylic acid, methyl acrylate, ethyl acrylate, propyl acrylate, butyl acrylate, octyl acrylate, 2-ethylhexyl acrylate, n-tetradecyl acrylate, n-hexadecyl acrylate, lauryl acrylate, cyclohexyl acrylate, diethylaminoethyl acrylate, dimethylaminoethyl acrylate and other acrylates, similarly methacrylic acid and methacrylates such as methyl methacrylate, ethyl methacrylate, propyl methacrylate, butyl methacrylate, amyl methacrylate, hexyl methacrylate, 2-ethylhexyl methacrylate, octyl methacrylate, decyl methacrylate, dodecyl methacrylate, lauryl methacrylate, cyclohexyl methacrylate, phenyl methacrylate, 2-hydroxyethyl methacrylate, 2-hydroxypropyl methacrylate, dimethylaminoethyl methacrylate, glycidyl methacrylate, stearyl methacrylate and the like. Other than the monomers as mentioned above, a small amount of other monomers within the range which can accomplish the objects of the present invention may be employed, such as acrylonitrile, 2-vinylpyridine, 4-vinylpyridine, vinyl carbazole, vinyl methyl ether, butadiene, isoprene, maleic anhydride, maleic acid, maleic acid monoesters, maleic acid diesters, vinyl acetate.

As the crosslinking agent to be used in the toner of the present invention, there may be included as a bifunctional crosslinking agent, divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, respective diacrylates of polyethylene glycol #200, #400, #600, dipropylene glycol diacrylate, polypropylene glycol diacrylate, polyester type diacrylate (MANDA, Nippon Kayaku, K.K.), and methacrylates corresponding to the above acrylates.

Examples of polyfunctional crosslinking agent may include pentaerythritol acrylate, trimethylolethane triacrylate, trimethylolpropane triacrylate, tetramethylolmethane tetraacrylate, oligoester acrylate, and corresponding methacrylates, 2,2-bis(4-methacryloxypolyethoxyphenyl)propane, diallyl phthalate, triallyl cyanurate, triallylazo cyanurate, triallyl isocyanurate, triallyl trimellitate, and diallyl chlorendate.

The method for synthesizing the binder resin according to the present invention may be preferably a method in which two or more kinds of polymers are synthesized.

In a method for preparing the binder resin of the present invention, a first resin is prepared by solution polymerization, the first resin is dissolved in a polymerizable monomer and the polymerizable monomer is suspension polymerized in the presence of the first resin and a crosslinking agent. It is preferable to dissolve 10 to 120 parts by weight, preferably 20 to 100 parts by weight of the first resin per 100 parts by weight of the monomer for suspension polymerization. During the suspension polymerization, it is preferable to use about 0.1 to 2.0 wt.% of a crosslinking agent based on the monomer to be suspension-polymerized. Slight change in these conditions may be tolerable depending on the kind of initiator and the reaction temperature.

It has been found that a binder resin obtained by dissolving a first polymer in a monomer followed by suspension polymerization of the monomer is different from a blended polymer obtained by mere mixing of the first polymer and a polymer obtained by suspension polymerization of the monomer without dissolving the first polymer.

The difference resides in the point that the former is slightly richer in high molecular weight components in the chromatogram of GPC of THF-soluble than the latter, giving a broader molecular weight distribution. The former comprises molecular weights of $30\times10^4$ or more at a ratio of 3 to 25 wt.% of the whole resin, which is clearly greater than that of the latter. This may be attributable to the fact that the first polymer dissolved influences suspension polymerization, which provides an advantageous effect not attainable by homogeneous mixing of the polymers. This is described in more detail by referring to the GPC charts shown in the accompanying drawings.

Figure 2:
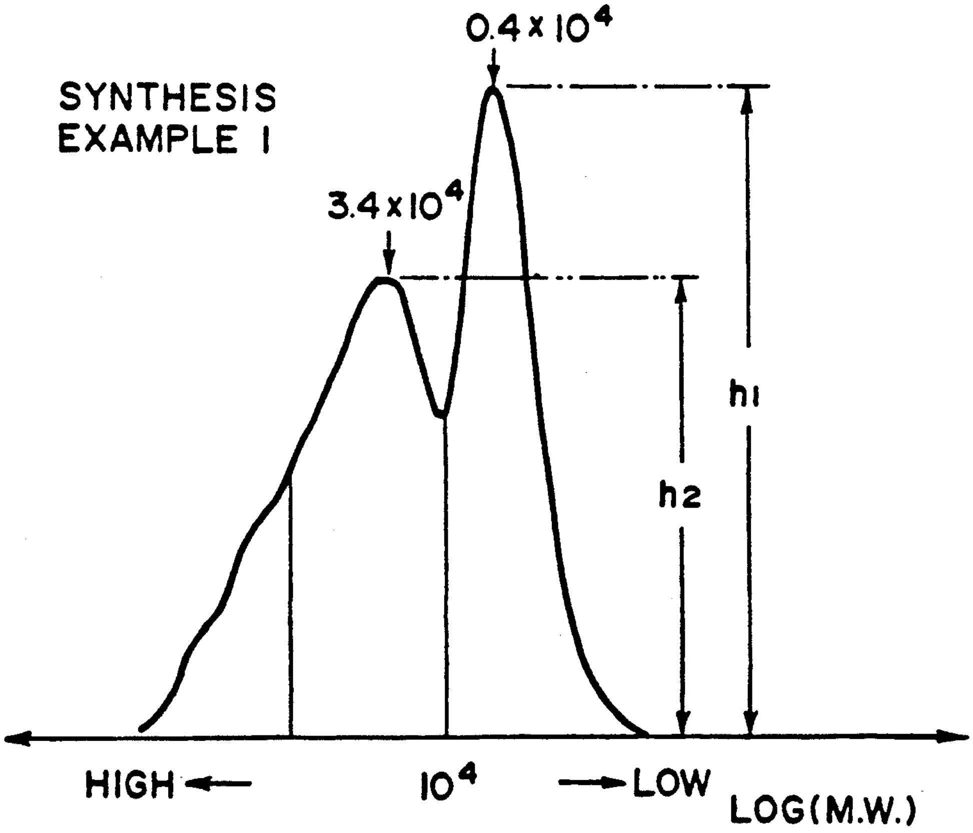
FIG. 2 shows a GPC chromatogram of the THF-soluble of the resin of Synthesis Example 1.
Figure 3:
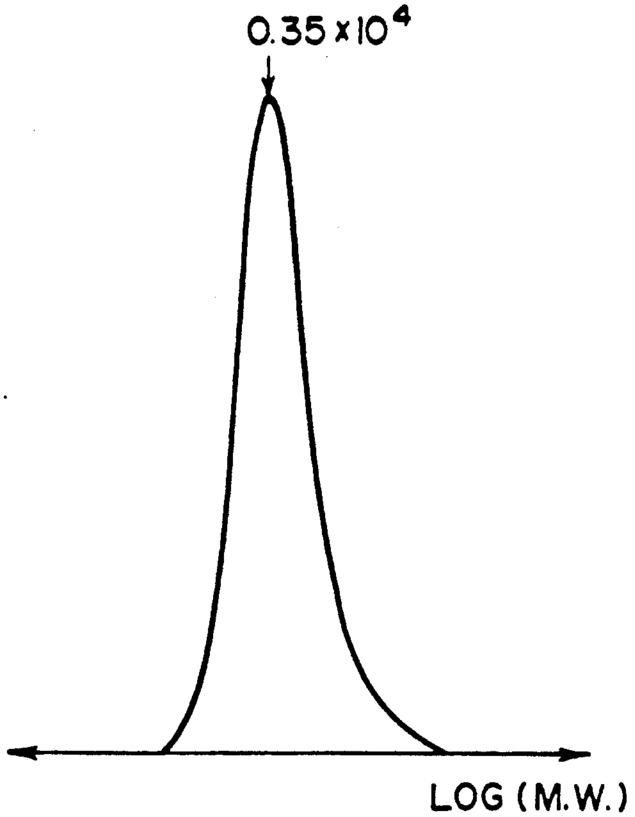
FIG. 3 shows a GPC chromatogram of THF-soluble of the polystyrene obtained in polymerization in the first step in Synthesis Example 1.
Figure 4:
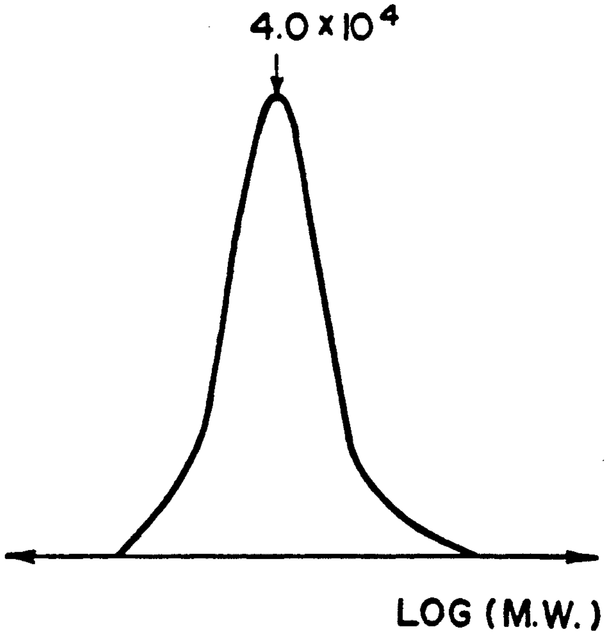
FIG. 4 shows a GPC chromatogram of THF-soluble of the copolymer obtained when the styrene-n-butyl acrylate copolymer in Synthesis Example 1 was suspension polymerized alone.

FIG. 2 in the accompanying drawings shows a chart of GPC of a resin composition obtained in Synthesis Example 1 as described below. FIG. 3 shows a chart of GPC of a polystyrene prepared in solution polymerization which is a first polymerization. The polystyrene was soluble in THF, and also soluble in styrene monomer and n-butyl acrylate monomer which were polymerization monomers, and had a main peak at a molecular weight of 3,500. FIG. 4 shows a chart of GPC of THF-soluble of the product formed by suspension polymerization of a styrene-n-butyl acrylate copolymer prepared in the second polymerization under the same conditions except that the polystyrene was not added. The styrene-n-butyl acrylate copolymer was found to have a main peak at a molecular weight of 40,000.

Figure 5:
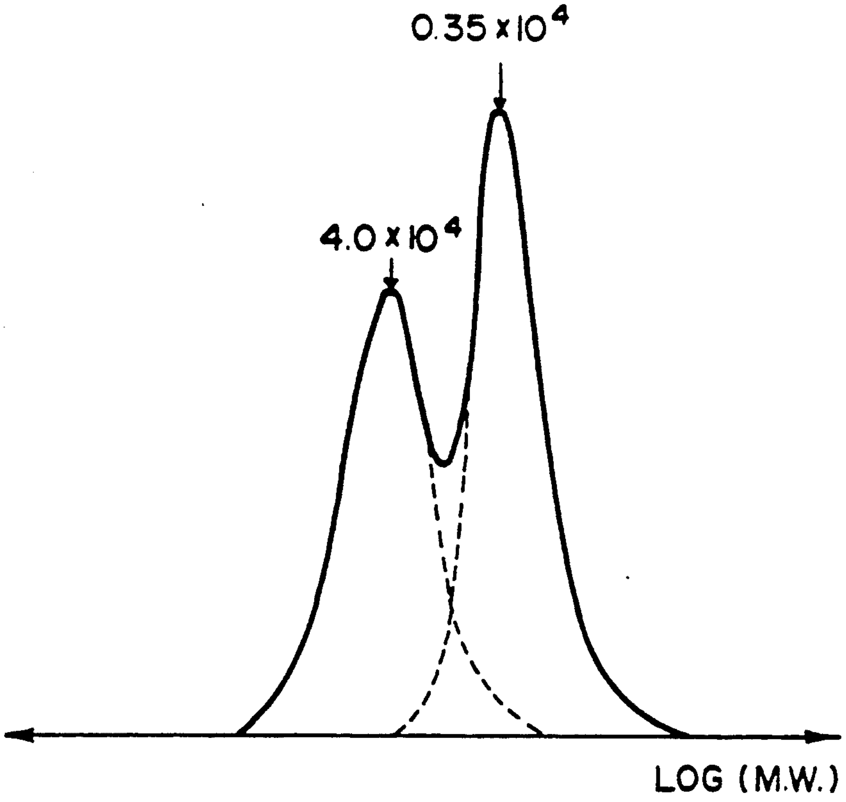
FIG. 5 is a combined chart of the chart in FIG. 3 and the chart in FIG. 4.

FIG. 5 is a combination of the chart in FIG. 3 and the chart in FIG. 4.

Figure 6:
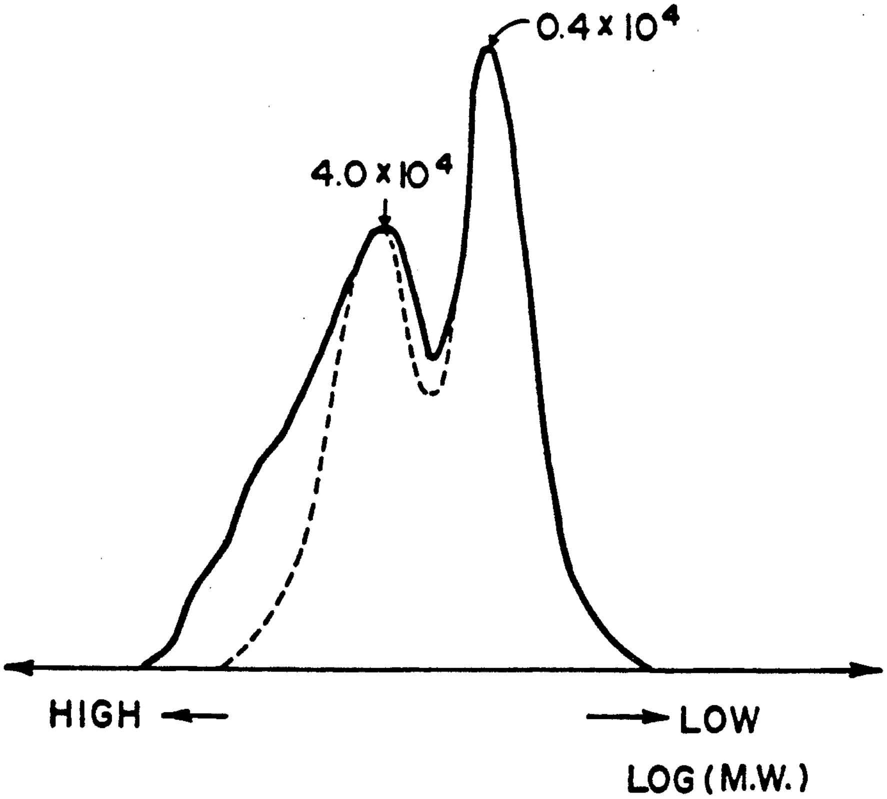
FIG. 6 is a chart prepared by overlapping the chart in FIG. 2 (solid line) with the chart in FIG. 5 (-broken line) for comparative purpose.
Figure 7:
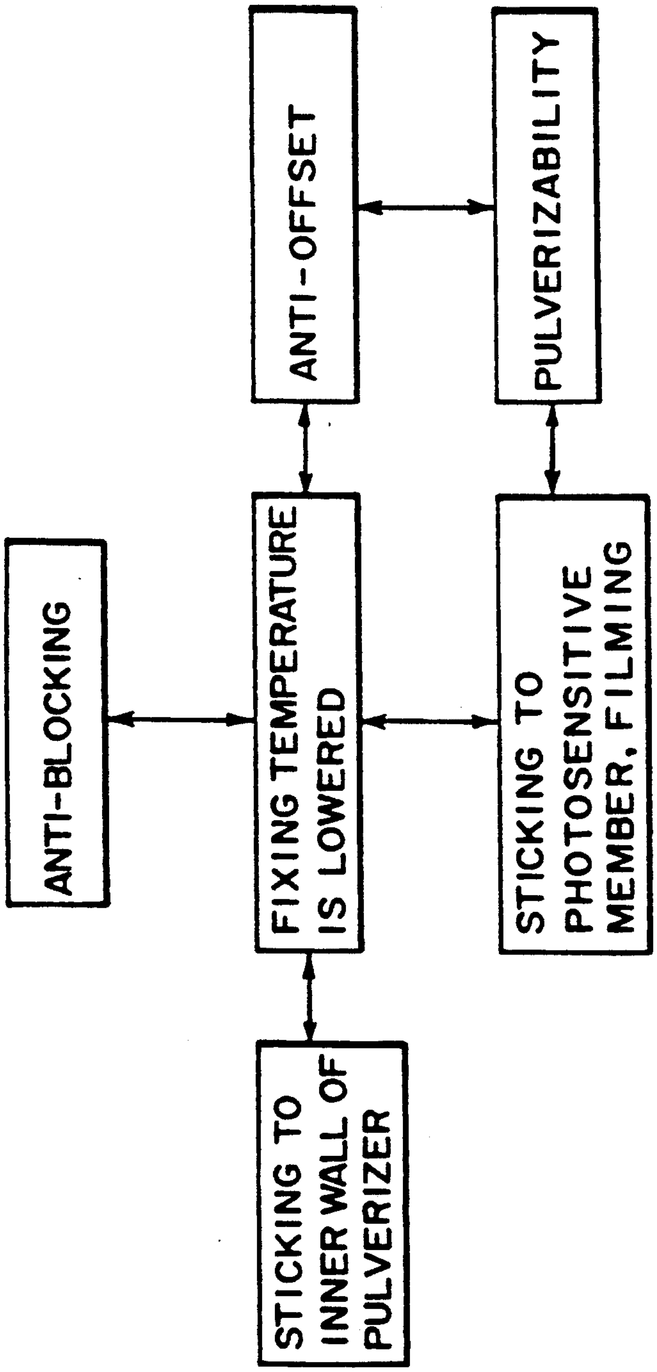
FIG. 7 is a diagram showing correlations between the respective characteristics demanded for the toner.

FIG. 6 shows a superposition of the chart in FIG. 2 and the chart in FIG. 5 (converted into a line). As is also apparent from FIG. 6, the resin composition obtained in Synthesis Example 1 according to the present invention was found to have a GPC chart which was different from that of the product obtained by merely mixing the polystyrene and the styrene-n-butyl acrylate copolymer separately polymerized. Particularly, on the higher molecular side, a polymer component not formed in the styrene-n-butyl acrylate copolymer alone is found to be formed. This higher molecular weight component may be considered to be formed by the presence of the polystyrene prepared in the first step solution polymerization during the suspension polymerization which is the second step polymerization, with the polystyrene functioning as the polymerization controller, whereby synthesis of the proportion of the THF-insoluble component and the THF-soluble component related to the molecular weight distribution of the styrene-n-butyl acrylate copolymer is controlled. In the resin composition according to the present invention, THF-insoluble, high molecular components soluble in THF, intermediate molecular weight components soluble in THF and low molecular weight components soluble in THF, are homogeneously mixed. Further, the resin composition according to the present invention has an ability of forming a new peak in the region of the molecular weights of $30\times10^4$ or higher (preferably $50\times10^4$ or higher) through cleavage of molecular chains in the melting and kneading step during preparation of toner, to control fixability and anti-offset characteristic of the toner.

Further, in the present invention, it is preferable that the components of molecular weights of $30\times10^4$ or more is contained in an amount of 5 to 30 wt.% (preferably 10 to 30 wt.%) of the binder resin based on GPC of THF-soluble in the toner. In GPC of THF-soluble in toner, a binder resin having a clear peak at molecular weights of $30\times10^4$ or higher (preferably $50\times10^4$ or higher) is more preferable with respect to improvement in anti-offset characteristic and anti-winding characteristic.

The solution polymerization process and the suspension polymerization process according to the present invention are described below.

As the solvent to be used in the solution polymerization, xylene, toluene, cumene, cellosolve acetate, isopropyl alcohol, benzene, etc. may be employed. In the case of a styrene monomer, xylene, toluene or cumene is preferred. It may be suitably selected depending on the polymer formed. The initiator may include di-tert-butylperoxide, tert-butyl peroxybenzoate, benzoyl peroxide, 2,2'-azobisisobutyronitrile, 2,2'-azobis(2,4-dimethylvalelonitrile), etc., which may be used at a concentration of 0.1 part by weight or more (preferably 0.4 to 15 parts by weight) based on 100 parts by weight of the monomer. The reaction temperature, which may depend on the solvent, the initiator employed and the polymer to be polymerized, may be preferably 70° C. to 180° C. In the solution polymerization, it is preferable to use 30 parts to 400 parts by weight of the monomer per 100 parts by weight of the solvent.

In the suspension polymerization, it is preferable to use 100 parts by weight or less (preferably 10 to 90 parts by weight) of the monomer per 100 parts by weight of an aqueous dispersion medium. Available dispersing agents may include polyvinyl alcohol, partially saponified polyvinyl alcohol, calcium phosphate, etc., and may be used in an amount of 0.05 to 1 part by weight based on 100 parts by weight of the aqueous dispersion medium as an appropriate amount while it may somewhat depend on the amount of the monomer relative to the aqueous dispersion medium. The polymerization temperature may be appropriately 50° to 95° C., and it should be selected suitably depending on the initiator employed and the desired polymer. Also, although any kind of initiator can be used so long as it is insoluble or hardly soluble in water, for example, benzoyl peroxide, tert-butylperoxy hexanoate, etc., may be used in an amount of 0.5 to 10 parts by weight based on 100 parts by weight of the monomer.

In the toner using the resin of the present invention, in addition to the above binder resin component, the following components may be incorporated at a ratio smaller than the content of said binder resin component, within the range which does not adeversely affect the effect of the present invention.

For example, there may be added silicone resin, polyester, polyurethane, polyamide, epoxy resin, polyvinyl butyral, rosin, modified rosin, terpene resin, phenol resin, aliphatic or alicyclic hydrocarbon resin such as low molecular weight polyethylene or low molecular weight polypropylene, aromatic petroleum resin, chlorinated paraffin, paraffin wax, and others.

As the charge controller to be used in the toner of the present invention, positive or negative charge controllers known in the art can be used. Examples of charge controllers known nowadays in the technical field concerned may include those as set forth below. (1) As the controller which controls the toner to be positively chargeable, the following substances may be included:.

nigrosine, azine type dyes containing alkyl group having 2 to 16 carbon atoms (e.g., C.I. Basic Yellow 2 (C.I. 41000), C.I. Basic Yellow 3, C.I. Basic Red 1 (C.I. 45160), C.I. Basic Red 9 (C.I. 42500), C.I. Basic Violet 1 (C.I. 42535), C.I. Basic Violet 3 (C.I. 42555), C.I.

Basic Violet 10 (C.I. 45170), C.I. Basic Violet 14 (C.I. 42510), C.I. Basic Blue 1 (C.I. 42025), C.I. Basic Blue 3 (C.I. 51005), C.I. Basic Blue 5 (C.I. 42140), C.I. Basic Blue 7 (C.I. 42595), C.I. Basic Blue 9 (C.I. 52015), C.I. Basic Blue 24 (C.I. 52030), C.I. Basic Blue 25 (C.I. 52025), C.I. Basic Blue 26 (C.I. 44025), C.I. Basic Green 1 (C.I. 42040), C.I. Basic Green 4 (C.I. 42000) lake pigments of these basic dyes lake-forming agent may be phosphotungstic acid, phosphomolybdic acid, phosphotungustomolybdic acid, tannic acid, lauric acid, gallic acid, ferricyanide, ferrocyanide), C.I. Solvent Black 3 (C.I. 26150), Hansa Yellow G (C.I. 11680), C.I. Mordant Black 11, C.I. Pigment Black 1.

For example, there may be employed benzoylmethylhexadecylammonium chloride, decyl-trimethylammonium chloride or dialkyltin compounds such as dibutyltin or dioctyltin, metal salts of higher fatty acids, inorganic fine powder such as that of zinc oxice and metal complexes of EDTA, acetylacetone, vinyl type polymers containing amino group, polyamine resin of condensed type polymer containing amino group. Particularly, in view of dispersibility, nigrosine, metal salts of higher fatty acids and vinyl type polymers having amino group are preferred.

(2) As the controller which controls the toner to be negatively chargeable, there are the following substances. First of all, those as described in Japanese Patent Publications JP-B 41-20153, 42-27596, 44-6397, 45-26478 may be included.

There are also dyes or pigments such as nitrohumic acid and salts thereof or C.I. 14645 as disclosed in Japanese Laid-Open Patent Application JP-A 50-133338; Zn, Al, Co, Cr, Fe metal complexes of salicylic acid, naphthoic acid, dicarboxylic acid; sulfonated copper phthalocyanine pigment; styrene oligomers having nitrile group or halogen introduced therein, and chlorinated paraffins. Particularly, from the aspect of dispersibilite, metal complexes of monoazo dyes, metal complexes of salicyclic acid, alkylsalicylic acid, naphthoic acid, diacrboxylic acid are preferred.

The toner of the present invention can be also mixed with other additives, if desired, to give good results. Examples of such additives may include lubricants such as Teflon, zinc stearate, polyvinylidene fluoride (among them, polyvinylidene fluoride is preferred); abrasives such as cerium oxide, silicon carbide, strontium titanate (among them, strontium titanate is preferred); flowability-imparting agents such as colloidal silica, aluminum oxide (among them, hydrophobic colloidal silica is particularly preferred); caking preventives; conductivity-imparting agents such as carbon black, zinc oxide, antimony oxide, tin oxide; fixing aids such as low-molecular weight polyethylene, low-molecular weight polypropylene, various waxes; or anti-offset agents. It is also possible to use a small amount of white fine particles and black fine particles of the opposite polarity as the developability improving agent.

Further, when the toner of the present invention is used as a two-component system developer, it is used in the form of a mixture with carrier powder. In this case, the mixing ratio of the toner and the carrier powder may be 0.1 to 50 wt.% in terms of the toner concentration, preferably 0.5 to 10 wt.%, more preferably 3 to 5 wt.%.

As the carrier which can be used in the present invention, those known in the art may be available. For example, powder having magnetic property such as iron powder, ferrite powder, nickel powder, glass beads, etc., and these materials subjected to the surface treatment with fluorine type resin or silicon type resin, may be employed.

Further, the toner of the present invention can be used also as a magnetic toner by further incorporating a magnetic material. In this case, the magnetic material also functions as a colorant. The magnetic material to be contained in the magnetic toner of the present invention may include iron oxides such as magnetite, hematite, ferrite or compounds of divalent metal and iron oxide; metal such as iron, cobalt, nickel or alloys of these metals with metals such as aluminum, cobalt, copper, lead, magnesium, tin, zinc, antimony, beryllium, bismuth, cadmium, calcium, manganese, selenium, titanium, tungsten, vanadium, and mixtures thereof.

These ferromagnetic materials may have average particle size of 0.1 to 2 μm, preferably about 0.1 to 0.5 μm, particularly preferable with spherical shapes. The amount contained in the toner may be about 20 to 200 parts by weight based on 100 parts by weight of the resin component, particularly preferably 40 to 180 parts by weight based on 100 parts by weight of the resin component.

Further, in the toner of the present invention, a colorant may be added, as desired.

As the colorant to be used in the toner of the present invention, any desired appropriate pigment or dye may be employed. For example, the pigment may include carbon black, aniline black, acetylene black, naphthol yellow, hansa yellow, rhodamine lake, alizarine lake, blood red, phthalocyanine blue, indanthrene blue. These may be used in amounts necessary and sufficient to maintain the optical density of the fixed image, namely 0.1 to 20 parts by weight, preferably 2 to 10 parts by weight, per 100 parts by weight of the resin. For similar purpose, dyes may be employed. For example, there are azo type dyes, anthraquinone type dyes, xanthene type dyes, methine dyes, which may be added in amounts of 0.1 to 20 parts by weight, preferably 0.3 to 3 parts by weight, per 100 parts by weight of the resin.

For preparation of the toner for development of electrostatic images according to the present invention, the above resin composition according to the present invention and the charge controller, optionally a magnetic material, a pigment or dye as the colorant and additives are sufficiently blended by a mixer such as ball mill, and melted and kneaded by a hot kneader such as heated rollers, kneader, extruder to have the pigment or dye dispersed or dissolved in the resins which have been made compatible with each other, and after solidification by cooling, pulverized and classified, whereby a toner with an average particle size of 3 to 20 μm can be obtained.

The present invention is described in detail below by referring to Examples, by which the present invention is not limited at all. In the following formulations, parts are parts by weight.

SYNTHESIS EXAMPLE 1

Into a reactor, 200 parts by weight of cumene were charged and the temperature was raised to the reflux temperature. To this was added dropwise a mixture of 100 parts by weight of styrene monomer and 9 parts of di-tert-butyl peroxide under cumene reflux over 4 hours. Further, under cumene reflux, solution polymerization was completed (146° C.-156° C.), and cumene was removed. The polystyrene obtained was found to be soluble in THF, with Mw=3,700, Mw/Mn=2.64, and the main peak of GPC was positioned at a molecular weight of 3,500, with Tg=57° C. The GPC chromatogram of the polystyrene is shown in FIG. 3.

The above polystyrene (30 parts by weight) was dissolved in the monomer mixture shown below to provide a mixed solution.

| Monomer mixture | Formulated ratio |
|---|---|
| Styrene monomer | 54 wt. parts |
| n-Butyl acrylate monomer | 16 wt. parts |
| Divinylbenzene | 0.3 wt. part |
| Benzoyl peroxide | 1 wt. part |
| tert-Butylperoxy-2-ethyl-hexanoate | 0.7 wt. part |

Into the above mixed solution, 170 parts by weight of water containing 0.1 part by weight of a partially saponified polyvinyl alcohol dissolved therein were added to form a suspension. The above suspension was added into a reactor charged with 15 parts by weight of water and replaced with nitrogen, and suspension polymerization was carried out at a reaction temperature of 70° to 95° C. for 6 hours. After completion of the reaction, the product was filtered off, dehydrated and dried to give a composition of a polystyrene and a styrene-n-butyl acrylate copolymer. This composition contained THF-insoluble and THF-soluble homogeneously mixed therein, and the polystyrene and the styrene-n-butyl acrylate copolymer were found to be homogeneously mixed. The content of the THF-insoluble (measured as the powder of 24 mesh pass, 60 mesh on) was 40 wt.%. More specifically, the THF-insoluble content was measured by placing about 0.5 g of the resin composition in a cylindrical filter paper (28×100 mm, No. 86R, produced by Toyo Roshi K.K.) and effecting the extraction with a Soxhlet's extractor at an average rate of about 7 times/hr. The molecular weight distribution of the THF-soluble was measured to give a result that there were peaks at the positions of about $0.4\times10^4$ and about $3.4\times10^4$ in the GPC chart, with $Mn=0.56\times10^4$, $Mw=13\times10^4$, $Mw/Mn=23$, and the molecular weights of 10: or lower being 21 wt.%. Further, Tg of the resin was 59° C., and the glass transition point $Tg_1$ of the components of $10^4$ or less separated by GPC was 57° C.

FIG. 2 shows the GPC chromatogram of the THF-soluble.

The characteristics concerning molecular weights of the respective resins and resin compositions were measured according to the following method.

By use of Shodex KF-80M as the column for GPC measurement, it was assembled in the heat chamber of 40° C. of a GPC measuring device (150C ALC/GPC produced by Waters Co.), and GPC operation was effected by injecting 200 μl of a sample (about 0.1 wt.% concentration of THF-soluble) under the condition of THF flow rate of 1 ml/min. and by using an RI for the detector. As the calibration curve for molecular weight measurement, THF solutions of mono-dispersed polystyrene standard materials (produced by Waters Co.) of the 10 points of molecular weights of $0.5\times10^3$, $2.35\times10^3$, $10.2\times10^3$, $35\times10^3$, $110\times10^3$, $200\times10^3$, $470\times10^3$, $1200\times10^3$, $2700\times10^3$ and $8420\times10^3$ were used.

COMPARATIVE SYNTHESIS EXAMPLE 1

The polystyrene obtained in Synthesis Example 1 (30 parts by weight) was dissolved in the following monomer mixture to provide a mixed solution.

| Monomer mixture | Formulated ratio |
|---|---|
| Styrene monomer | 54 wt. parts |
| n-Butyl acrylate monomer | 16 wt. parts |
| Divinylbenzene | 1.5 wt. parts |
| Benzoyl peroxide | 1 wt. part |

The above mixture was subjected to suspension polymerization in the same manner as in Synthesis Example 1 to obtain a composition of a polystyrene and a styrene-n-butyl acrylate copolymer. The content of THF-insoluble in this resin was 75 wt. %, thus containing a large amount of THF-insoluble.

COMPARATIVE SYNTHESIS EXAMPLE 2

The polystyrene obtained in Synthesis Example 1 (30 parts by weight) was dissolved in the following monomer mixture to provide a mixed solution.

| Monomer mixture | Formulated ratio |
|---|---|
| Styrene monomer | 54 wt. parts |
| n-Butyl acrylate monomer | 16 wt. parts |
| Divinylbenzene | 0.13 wt. part |
| tert-Butylperoxyhexanoate | 1.0 wt. part |

The above mixture was subjected to suspension polymerization in the same manner as in Synthesis Example 1 to obtain a composition of a polystyrene and a styrene-n-butyl acrylate copolymer. In the GPC chromatogram of the THF-soluble of this composition, there were peaks at the positions of a molecular weight of about 4,000 and a molecular weight of $15\times10^4$.

COMPARATIVE SYNTHESIS EXAMPLE 3

Into a reactor, 150 parts by weight of xylene was charged and the temperature was raised to the reflux temperature. To this was added dropwise a mixture of 100 parts by weight of styrene monomer, 2 parts by weight of tert-butylperoxybenzoate, and 1 part by weight of di-tertbutylperoxide under xylene reflux in 4 hours. Further, solution polymerization was completed under xylene reflux (138°-144° C.), and xylene was removed.

The polystyrene obtained was soluble in THF, with Mw=10,000, Mw/Mn=3.22, and the main peak was positioned at a molecular weight of 11,000, with Tg=82° C.

The above polystyrene (30 parts by weight) was dissolved in the monomer mixture shown below to provide a mixed solution.

| Monomer mixture | Formulated ratio |
|---|---|
| Styrene monomer | 52 wt. parts |
| n-Butyl acrylate monomer | 18 wt. parts |
| Divinylbenzene | 0.25 wt. parts |
| Benzoyl peroxide | 0.4 wt. parts |
| tert-Butylperoxy-2-ethylhexanoate | 1 wt. parts |

The above mixture was subjected to suspension polymerization in the same manner as in Synthesis Example 1 to obtain a composition of a polystyrene and a styrene-n-butyl acrylate copolymer. In the GPC chromatogram of the THF-soluble of this composition, there was substantially no peak at molecular weights of about 10,000 or less.

COMPARATIVE SYNTHESIS EXAMPLE 4

In the monomer mixture shown below, 170 parts by weight of water containing 0.1 part by weight of a partially saponified polyvinyl alcohol dissolved therein were added to provide a suspension.

| Monomer mixture | Formulated ratio |
|---|---|
| Styrene monomer | 70 wt. parts |
| α-Methylstyrene monomer | 6 wt. parts |
| n-Butyl acrylate monomer | 23 wt. parts |
| Divinylbenzene | 0.9 wt. parts |
| Benzoyl peroxide | 3 wt. parts |

The above suspension was added into a reactor charged with 15 parts by weight of water and replaced with nitrogen, and suspension polymerization was carried out at a reaction temperature of 70°-95° C. for 6 hours. After completion of the reaction, the product was filtered off, dehydrated and dried to give a styrene-n-butyl acrylate copolymer.

The copolymer had a main peak at a molecular weight of about 17,000, and substantially no peak at molecular weights of $10^4$ or less.

SYNTHESIS EXAMPLE 2

Into a reactor, 150 parts by weight of cumene was charged, and the temperature was raised to the reflux temperature. The following mixture was added dropwise under cumene reflux over 4 hours.

| Monomer mixture | Formulated ratio |
|---|---|
| Styrene monomer | 97.5 wt. parts |
| n-Butyl acrylate monomer | 2.5 wt. parts |
| Di-tert-butyl peroxide | 4 wt. parts |

Further, polymerization was completed under cumene reflux (146°-156° C.) and cumene was removed. The styrene-n-butyl acrylate copolymer obtained had Mw=6,900, Mw/Mn=2.3 a main peak at a molecular weight of 7,100, and Tg=60° C.

The above styrene-n-butyl acrylate copolymer (40 parts by weight) was dissolved in the following monomer mixture to provide a mixture.

| Monomer mixture | Formulated ratio |
|---|---|
| Styrene monomer | 38 wt. parts |
| n-Butyl methacrylate monomer | 22 wt. parts |
| Divinylbenzene | 0.24 wt. parts |
| Benzoyl peroxide | 0.65 wt. parts |
| tert-Butylperoxy-2-ethylhexanoate | 0.85 wt. parts |

Into the above mixture, 170 parts by weight of water containing 0.1 part by weight of a partially saponified polyvinyl alcohol dissolved therein were added to form a suspension.

The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a composition of a styrene-n-butyl acrylate copolymer and a styrene-n-butyl methacrylate copolymer.

SYNTHESIS EXAMPLE 3

Into a reactor, 200 parts by weight of cumene were charged, and the temperature was raised to the reflux temperature. The following mixture was added dropwise under cumene reflux over 4 hours.

| Monomer mixture | Formulated ratio |
|---|---|
| Styrene monomer | 100 wt. parts |
| Di-tert-butyl peroxide | 8 wt. parts |

Further, polymerization was completed under cumene reflux (146°-156° C.) and cumene was removed. The polystyrene obtained had Mw=3,700, Mw/Mn=2.64, a main peak at a molecular weight of 3,500, and Tg=57° C.

The above polystyrene (30 parts by weight) was dissolved in the following monomer mixture to provide a mixture.

| Monomer mixture | Formulated ratio |
|---|---|
| Styrene monomer | 56 wt. parts |
| 2-Ethylhexyl acrylate monomer | 14 wt. parts |
| Divinylbenzene | 0.14 wt. parts |
| tert-Butylperoxy-2-ethylhexanoate | 1.6 wt. parts |

Into the above mixture, 170 parts by weight of water containing 0.1 part by weight of a partially saponified polyvinyl alcohol dissolved therein were added to form a suspension.

The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a composition of a polystyrene and a styrene-2-ethylhexyl acrylate copolymer.

SYNTHESIS EXAMPLE 4

Into a reactor, 150 parts by weight of cumene were charged, and the temperature was raised to the reflux temperature. The following mixture was added dropwise under cumene reflux over 4 hours.

| Monomer mixture | Formulated ratio |
|---|---|
| Styrene monomer | 100 wt. parts |
| Di-tert-butyl peroxide | 4 wt. parts |

Further, polymerization was completed under cumene reflux (146°-156° C.) and cumene was removed. The polystyrene obtained had Mw=5,200, Mw/Mn=2.74, a main peak at a molecular weight of 5,300 and Tg=75° C.

The above polystyrene (50 parts by weight) was dissolved in the following monomer mixture to provide a mixture.

| Monomer mixture | Formulated ratio |
|---|---|
| Styrene monomer | 37 wt. parts |
| n-Butyl acrylate monomer | 13 wt. parts |
| Divinylbenzene | 0.2 wt. parts |

-continued

| Monomer mixture | Formulated ratio |
| --- | --- |
| Benzoyl peroxide | 0.8 wt. parts |

Into the above mixture, 170 parts by weight of water containing 0.1 part by weight of a partially saponified polyvinyl alcohol dissolved therein were added to form a suspension.

The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a composition of a polystyrene and a styrene-n-butyl acrylate copolymer.

SYNTHESIS EXAMPLE 5

Into a reactor, 200 parts by weight of cumene were charged, and the temperature was raised to the reflux temperature. The following mixture was added dropwise under cumene reflux over 4 hours.

| Monomer mixture | Formulated ratio |
| --- | --- |
| Styrene monomer | 90 wt. parts |
| Methyl methacrylate monomer | 10 wt. parts |
| Di-tert-butyl peroxide | 8 wt. parts |

Further, polymerization was completed under cumene reflux (146°-156° C.) and cumene was removed. The styrene-methyl methacrylate copolymer obtained had Mw=3,900, Mw/Mn=2.6, a main peak at a molecular weight of 4,100, and Tg=60° C.

The above styrene-methyl methacrylate copolymer (30 parts by weight) was dissolved in the following monomer mixture to provide a mixture.

| Monomer mixture | Formulated ratio |
| --- | --- |
| Styrene monomer | 54 wt. parts |
| n-Butyl methacrylate monomer | 16 wt. parts |
| Divinylbenzene | 0.3 wt. parts |
| Benzoyl peroxide | 1.4 wt. parts |

Into the above mixture, 170 parts by weight of water containing 0.1 part by weight of a partially saponified polyvinyl alcohol dissolved therein were added to form a suspension. The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a composition of a styrene-methyl methacrylate copolymer and a styrene-n-butyl methacrylate copolymer.

SYNTEHSIS EXAMPLE 6

Into a reactor, 200 parts by weight of cumene was charged, and the temperature was raised to the reflux temperature. The following mixture was added dropwise under cumene reflux over 4 hours.

| Monomer mixture | Formulated ratio |
| --- | --- |
| Styrene monomer | 95 wt. parts |
| α-Methylstyrene | 5 wt. parts |

-continued

| Monomer mixture | Formulated ratio |
| --- | --- |
| Di-tert-butyl peroxide | 8 wt. parts |

Further, polymerization was completed under cumene reflux (146°-156° C.) and cumene was removed. The styrene-o-methylstyrene copolymer obtained had Mw=4,500, Mw/Mn=2.8, a main peak at a molecular weight of 4,400 and Tg=63° C.

The above styrene-methyl methacrylate copolymer (30 parts by weight) was dissolved in the following monomer mixture to provide a mixture.

| Monomer mixture | Formulated ratio |
| --- | --- |
| Styrene monomer | 53 wt. parts |
| n-Butyl methacrylate monomer | 17 wt. parts |
| Divinylbenzene | 0.3 wt. part |
| Benzoyl peroxide | 1.4 wt. parts |

Into the above mixture, 170 parts by weight of water containing 0.1 part by weight of a partially saponified polyvinyl alcohol dissolved therein was added to form a suspension. The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a composition of a styrene-α-methylstyrene copolymer and a styrene-n-butyl methacrylate copolymer.

COMPARATIVE SYNTHESIS EXAMPLE 5

Into a reactor, 200 parts by weight of cumene were charged, and the temperature was raised to the reflux temperature. The following mixture was added dropwise under cumene reflux over 4 hours.

| Monomer mixture | Formulated ratio |
| --- | --- |
| Styrene monomer | 100 wt. parts |
| Di-tert-butyl peroxide | 8 wt. parts |

Further, polymerization was completed under cumene reflux (146°-156° C.) and cumene was removed. The polystyrene obtained had Mw=3,700, Mw/Mn=2.64, a main peak at a molecular weight of 3,500, and Tg=57° C. The above polystyrene (30 parts by weight) was dissolved in the following monomer mixture to provide a mixture.

| Monomer mixture | Formulated ratio |
| --- | --- |
| Styrene monomer | 56 wt. parts |
| n-Butyl acrylate monomer | 14 wt. parts |
| Divinylbenzene | 0.05 wt. part |
| Benzoyl peroxide | 2 wt. parts |

Into the above mixture, 170 parts by weight of water containing 0.1 part by weight of a partially saponified polyvinyl alcohol dissolved therein was added to form a suspension.

The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a composition of a polystyrene and a styrene-n-butyl acrylate copolymer. This composition contained about 3 wt. % of THF-insoluble, thus containing only a small amount of THF-insoluble.

EXAMPLE 1

| | |
|---|---|
| Resin composition of Synthesis Example 1 | 100 wt. parts |
| Magnetic material | 60 wt. parts |
| Negative charge controlling agent | 2 wt. parts |
| Low-molecular weight polypropylene | 3 wt. parts |

The above materials were premixed by a Henschel mixer and then kneaded oh a two-roll mill heated to 150° C. for 20 minutes. After the kneaded product was left to cool, it was coarsely crushed by a cutter mill, then pulverized with the use of a micropulverizer by use of jet air stream, further classified by a wind-force classifier to obtain black fine powder with a volume-average particle size of 11.5 μm. The GPC chart of the THF-soluble of the black fine powder is shown in FIG. 1.

A developer (toner) was obtained by dry blending 0.4 part by weight of hydrophobic colloidal silica fine powder with 100 parts by weight of the black fine powder.

The pulverizability of a kneaded cooled product for toner can be represented by a treating rate, i.e., the amount of the product which can be pulverized per unit time and, in the case of this toner, the rate was very good as 15 kg/hr under an air pressure of 5.5 $kg/cm^2$. No sticking occurred within the pulverizer.

Anti-blocking characteristic was examined by placing about 10 g of the toner in a plastic cup of 100 cc, and the change in agglomeration degree when the toner was left to stand at 50° C. for one day was examined. The agglomeration degree was measured by a powder tester produced by Hosokawa Micron K.K. The product left to stand at room temperature and the product left to stand at 50° C. for one day exhibited substantially the same values of 10 wt. % and 12. wt.%, respectively, with the difference (ΔG) being 2%. From this result, it was confirmed that substantially no blocking occurred.

Fixability, anti-offset characteristic, anti-winding characteristic and image quality, successive copying characteristics were examined by means of a high speed copying machine (NP-8570 produced by Canon K.K., 70 sheets per minute, 100 V).

Particularly, anti-offset characteristic was evaluated by dismantling the cleaning mechanism of the fixing rollers and counting the number of the sheets of successive copying after which the image or the rollers were contaminated.

The test was conducted by lowering the set temperature of the fixer by 5° C. Fixability was measured by rubbing the image with Silbon C paper reciprocally for 10 times under a load of about 100 g, and peeling of the image was represented by a lowering in percentage (%) of the reflective density. The evaluation of image was effected on a 200th sheet when 200 copies were continuously taken.

Anti-winding characteristic was evaluated by copying three sheets of a whole surface black image and by observing the trace remaining on the copies of a pawl for peeling attached to the fixing roller to judge how the peeling relied on the pawl.

As the result, fixability was very good with a lowering in percentage of 3%, anti-offset characteristic was good without any contamination on image or roller, and anti-winding characteristic was very good, although a trace of the pawl showing the reliance on the pawl was slightly observed on the image.

By using an image with an image area ratio of about 5%, a successive copying test of 50,000 sheets was conducted, whereby good images were obtained without sticking or filming onto the photosensitive member.

COMPARATIVE EXAMPLES 1-5

By use of the resin compositions prepared in Comparative Synthesis Examples 1-5 in place of the resin composition in Example 1, toners were prepared in the same manner as in Example 1, and the toners thus obtained were called Comparative Examples 1-5.

The toners of Comparative Examples were evaluated to provide the results shown in Table 1.

TABLE 1

| | Pulverizability (kg/hr) | Anti-sticking char. | Anti-blocking char. ΔG (%) | Fixability (%) | Anti-offset char. (sheets) | Anti-winding char. | Image quality | Successive copying char. (sheets) |
|---|---|---|---|---|---|---|---|---|
| Example 1 | ∘ (15) | ∘ | ∘ (2) | ∘ (2) | ∘ | ∘ | ∘ | ∘ |
| Comparative Example 1 | ∘ (18) | × | × (40) | ∘ (4) | × (700) | ∘ | Δ** | × (5000) |
| Comparative Example 2 | × (5) | ∘ | ∘ (4) | × (15) | ∘ | ∘ | ∘ | ∘ |
| Comparative Example 3 | × (7) | ∘ | ∘ (5) | × (12) | ∘ | ∘ | ∘ | ∘ |
| Comparative Example 4 | ∘ (15) | ∘ | ∘ (4) | × (13) | × (1000) | × | ∘ | ∘ |
| Comparative Example 5 | × (8) | ∘ | ∘ (6) | ∘ (6) | × (500) | × | ∘ | ∘ |

**Low density

EXAMPLE 2

| | |
|---|---|
| Resin composition of Synthesis Example 2 | 100 wt. parts |
| Magnetic material | 60 wt. parts |
| Positive charge controlling agent | 2 wt. parts |
| Low molecular weight polypropylene | 4 wt. parts |

Black fine powder was prepared from the above mixture and then a toner was prepared in the same manner as in Example 1. The black fine powder had a volume average particle size of 11.7 μm.

A colloidal silica fine powder treated with an amino-modified silicone oil was employed.

The pulverizability of the kneaded cooled product for toner was very good as indicated by the treating rate of 16 kg/hr. No sticking occurred in the pulverizer. There was no problem in anti-image blocking characteristic with ΔG=3%.

Image quality and fixing relationship were evaluated by a personal copying machine (FC-5 produced by Canon K.K.).

As the result, image quality was good, with good images being continually produced until there was no toner, and there was neither filming nor sticking onto the photosensitive member.

With the set temperature in the fixer being lowered by 10° C., the cleaning mechanism in the fixer was removed and the above image formation was effected to give the result that fixability was very good with a lowering in percentage-reflective density of about 0%, without problems in anti-offset characteristic or anti-winding characteristic.

EXAMPLE 3

Except for changing the resin composition in Example 2 to the resin composition of Synthesis Example 3, black fine powder was prepared, and then a toner was prepared in the same manner as in Example 2.

The black powder had a volume-average particle size of 11.3 μm.

The pulverizability of the kneaded cooled product for toner was very good as the treating rate of 15.5 kg/hr. Also, no sticking occurred in the pulverizer.

There was no problem at all in anti-blocking characteristic with $\Delta G=2\%$, Image quality and fixing relationship were evaluated by a copying machine (NP-5540.produced by Canon K.K.; OPC photosensitive member, 40 sheets per minute).

As the result, good images were stably obtained by successive copying of 50,000 sheets. There was no filming or sticking onto the photosensitive member.

With the set temperature in the fixer being lowered by 10° C., the cleaning mechanism in the fixer was removed and the above successive copying was conducted to give a result that fixability was very good with a lowering in percentage-reflective density of about 3%, without problems in anti-offset characteristic and anti-winding characteristic.

EXAMPLE 4

Except for changing the resin composition in Example 2 to the resin composition of Synthesis Example 4, black fine powder was prepared, and then a toner was prepared in the same manner as in Example 2.

The black powder had a volume-average particle size of 11.7 μm.

The pulverizability of the kneaded cooled product for toner was very good as the treating rate of 15.2 kg/hr. No sticking occurred in the pulverizer. There was no problem at all in anti-blocking characteristic with $\Delta G=3\%$.

Image quality and fixing relationship were evaluated by a digital copying machine using an amorphous Si photosensitive member (NP-9030 produced by Canon K.K.). As the result, good images were stably obtained by successive copying of 50,000 sheets. There was no filming or sticking onto the photosensitive member.

With the set temperature in the fixer being lowered by 10° C., the cleaning mechanism in the fixer was removed and the above successive copying was conducted to give a result that fixability was very good with a lowering in percentage-reflective density of about 2%, without problems in anti-offset characteristic or anti-winding characteristic.

EXAMPLE 5

Except for changing the resin composition in Example 1 to the resin composition of Synthesis Example 5, black fine powder was prepared, and then a toner was prepared in the same manner as in Example 1.

The black powder had a volume-average particle size of 11.4 μm.

The pulverizability of the kneaded cooled product for toner was very good as the treating rate of 17.1 kg/hr. No sticking occurred in the pulverizer. There was no problem at all in anti-blocking characteristic with $\Delta G=3\%$.

Image quality and fixing relationship were evaluated by a copying machine (NP-400 RE produced by Canon K.K.).

As the result, good images were stably obtained by successive copying of 50,000 sheets. There was no filming or sticking onto the photosensitive member.

With the set temperature in the fixer being lowered by 10° C., the cleaning mechanism in the fixer was removed and the above successive copying was conducted to give a result that fixability was very good with a lowering in percentage-reflective density of about 4%, without problems in anti-offset characteristic or anti-winding characteristic.

EXAMPLE 6

Resin composition of Synthesis

| | |
|---|---|
| Example 6 | 100 wt. parts |
| Carbon black | 6 wt. parts |
| Positive charge controlling agent | 2 wt. parts |
| Low-molecular weight polypropylene | 3 wt. parts |

Black fine powder was prepared from the above mixture and then a toner was prepared in the same manner as in Example 1. This toner was mixed with about 10 wt. % of iron powder with particle sizes of 200–300 mesh to provide a developer.

The pulverizability of the kneaded cooled product for toner was very good as the treating rate of 15.2 kg/hr. No sticking occurred in the pulverizer. There was no problem in anti-blocking characteristic with $\Delta G=4\%$.

Image quality and fixing relationship were evaluated by an ultra-high speed copying machine (NP-8500 Super produced by Canon K.K.). As the result, good quality of images could be stably obtained by successive copying of 100,000 sheets. There was neither filming nor sticking onto the drum.

With the set temperature in the fixer being lowered by 10° C., the cleaning mechanism in the fixer was removed and the above image formation was effected to give a result that fixability was very good with a lowering in percentage-reflective density of about 5%, without problems in anti-offset characteristic or anti-winding characteristic.

The characteristic parameters of the above-described toners are inclusively shown in Table 2.

TABLE 2

| | Toner properties | | | | | | | | |
|---|---|---|---|---|---|---|---|---|---|
| | THF insoluble (%) | Solubles ($\times 10^4$) | Solubles Mw/Mn | Peak position $P_1$ ($\times 10^4$) | Peak position $P_2$ ($\times 10^4$) | Higher mol. wt. side peak ($\times 10^4$) | Content of $10^4$ or less (%) | $Tg_1$ | $Tg_f$ |
| Example 1 | 37 | 24 | 42 | 0.4 | 3.5 | 186 | 33 | 56 | 57 |
| Comparative | | | | | | | | | |

TABLE 2-continued

| | | Toner properties | | | | | | | | |
|---|---|---|---|---|---|---|---|---|---|---|
| | | THF insoluble (%) | Solubles (× $10^4$) | Solubles Mw/Mn | Peak position $P_1$ (× $10^4$) | Peak position $P_2$ (× $10^4$) | Higher mol. wt. side peak (× $10^4$) | Content of $10^4$ or less (%) | $Tg_1$ | $Tg_l$ |
| Example | 1 | 68 | 15 | 65 | 0.3 | — | 300 | 28 | 55 | 57 |
| " | 2 | 28 | 29 | 48 | 0.4 | 15 | 210 | 34 | 56 | 55 |
| " | 3 | 42 | 19 | 25 | 1.2 | 5.1 | 290 | 17 | 78 | 55 |
| " | 4 | 30 | 21 | 26 | 1.7 | — | 160 | 21 | 47 | 60 |
| " | 5 | 3 | 24 | 41 | 0.4 | 3.6 | 100 | 34 | 56 | 60 |
| Example | 2 | 29 | 20 | 32 | 0.7 | 4.0 | 210 | 40 | 58 | 58 |
| " | 3 | 35 | 25 | 42 | 0.4 | 6.9 | 230 | 32 | 55 | 56 |
| " | 4 | 25 | 17 | 28 | 0.6 | 5.0 | 180 | 45 | 70 | 59 |
| " | 5 | 30 | 24 | 41 | 0.4 | 4.0 | 180 | 29 | 58 | 59 |
| " | 6 | 29 | 22 | 35 | 0.5 | 4.1 | 190 | 31 | 60 | 58 |

In the following, the present invention is described by referring to other Synthesis Examples and Examples.

Parts in the following formulations are all parts by weight.

SYNTHESIS EXAMPLE 7

Into 200 parts of toluene at the boiling point, a mixture of 70 parts of styrene, 20 parts of n-butyl acrylate, 10 parts of α-methylstyrene and 6 parts of benzoyl peroxide was added dropwise over 5 hours, and thereafter polymerization was further carried out by maintaining the mixture at the boiling point for 3 hours, followed by removal by vacuum drying, to give a low-molecular weight polymer-1. Next, a homogeneous mixture of 70 g of the low-molecular weight polymer-1, 75 parts of styrene, 24 parts of n-butyl acrylate, 1 part of divinylbenzene and 4 parts of benzoyl peroxide, was suspended in 300 parts of water containing 0.8 part of a partially saponified polyvinyl alcohol dissolved therein, and polymerization was carried out at a temperature of 80° C. for 15 hours to obtain a pearl-like resin composition in which from high-molecular weight polymers to low-molecular weight polymers were homogeneously mixed. The resin composition was dried under a reduced pressure to give a resin composition-7.

The resin composition-7 was accurately weighed at about 0.5 g, placed in a cylindrical filter paper (No. 86R produced by Toyo Roshi K.K.) and subjected to Soxlet's extraction by using 180 ml of chloroform for 6 hours. After evaporation for removal of the medium from the soluble extracted, the residue was vacuum-dried at 100° C. for 12 hours, and the soluble resin component was weighed. From the original sample weight and this value, the gel component weight (crosslinking degree) was determined according to the formula as described before. Further, the soluble resin component was dissolved in THF to form a sample with 0.1 wt. % concentration and passed through a sample pretreatment filter for non-aqueous system to provide a sample for GPC. Shodex KF-80M as the column for GPC measurement was assembled in the heat chamber at 40° C. of a GPC measuring device (150 C ALC/GPC produced by Waters Co.), and GPC was effected by injecting 200 μl of a sample (about 0.1 wt. % concentration of the THF-soluble) under the condition of THF flow rate of 1 ml/min and by using an RI for the detector. As the calibration curve for molecular weight measurement, THF solutions of mono-dispersed polystyrene standard materials (produced by Waters Co.) of the 10 points of molecular weights of $0.5\times10^3$, $2.35\times10^3$, $10.2\times10^3$, $35\times10^3$, $110\times10^3$, $200\times10^3$, $470\times10^3$, $1200\times10^3$, $2700\times10^3$ and $8420\times10^3$ were used.

Figure 10:
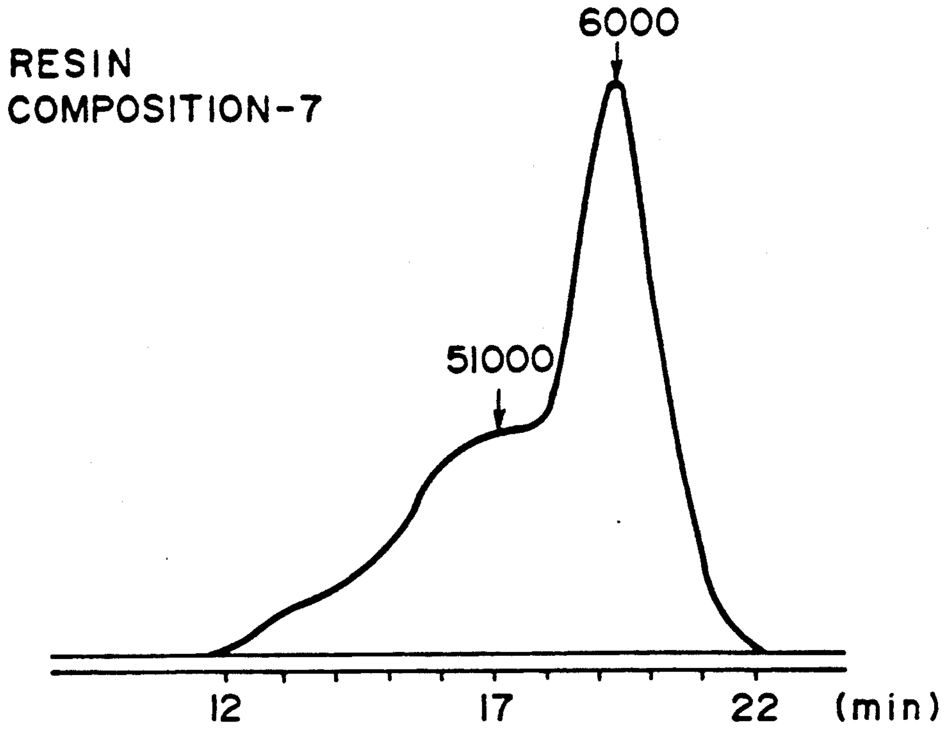
FIG. 10 shows a chromatogram of the THF-soluble of the resin composition-7.

The gel content in the resin composition-7 was found to be 33 wt. %, and the molecular weight main peak value of the eluted component was 6000 and the sub-peak value was 51000. FIG. 10 shows the chromatogram by GPC.

SYNTHESIS EXAMPLE 8

In the suspension polymerization, 120 parts of the low-molecular weight polymer, 0.5 parts of divinylbenzene and 2 parts of t-butylperoxy-2-ethylhexanoate as the polymerization initiator were used, and following otherwise the same procedure as in Synthesis Example 7, a pearl-like resin composition-8 was obtained. This resin composition showed a gel component of 5 wt.%, with the main peak value of molecular weight of the eluted component being 5000 and the shoulder value 82000.

SYNTHESIS EXAMPLE 9 .

In the suspension polymerization, 1.4 parts of divinylbenzene and 4.5 parts of benzyl peroxide as the polymerization initiator were used, and following otherwise the same procedure as in Synthesis Example 7, a pearl-like resin composition-9 was obtained. The resin composition contained a gel component of 45 wt. %, with the main peak value of molecular weight of the eluted component being 5000 and the shoulder value 31000.

SYNTHESIS EXAMPLE 10

In the suspension polymerization, 60 parts of the low molecular weight polymer, 1.9 parts of divinylbenzene and 4.5 parts of benzoyl peroxide as the polymerization initiator were used, and following otherwise the same procedure as in Synthesis Example 7, a pearl-like resin composition-10 was obtained. This resin composition contained a gel component of 55 wt. %, with the main peak value of molecular weight of the eluted component being 5000 and the shoulder value 33000.

SYNTHESIS EXAMPLE 11

In the suspension polymerization, 1 part of triethylene glycol diacrylate was used as the cross-linking agent in place of divinylbenzene, and following otherwise the same procedure as in Synthesis Example 7, a pearl-like resin composition-11 was obtained. This resin composition contained a gel component of 27 wt. %, with the main peak value of molecular weight of the eluted component being 5800 and the sub-peak value 48000.

COMPARATIVE SYNTHESIS EXAMPLE 6

In synthesis of the low-molecular weight polymer, carbon tetrachloride was added to the solvent, and 65 parts of styrene, 15 parts of o-methylstyrene and 7 parts of benzoyl peroxide were used, and following otherwise the same procedure for synthesis of the low-molecular weight polymer-1 as in Synthesis Example 7, a low-molecular weight polymer-2 was obtained. Next, the same procedure as in Synthesis Example 7 was repeated except for using 70 parts of the low-molecular weight polymer-2, 8 parts of o-methylstyrene and 5 parts of benzoyl peroxide, to obtain a pearl-like comparative resin composition-6. This resin composition had a gel component of 30 wt. %, with the main peak value of the eluted component being 900, and the shoulder value 13000.

COMPARATIVE SYNTHESIS EXAMPLE 7

In synthesis of the low-molecular weight polymer, without use of o-methylstyrene and by use of correspondingly increased amount of styrene and 3 parts of benzoyl peroxide, and following otherwise the same procedure for synthesis of the low-molecular weight polymer-1 as in Synthesis Example 7, a low-molecular weight polymer-3 was obtained. Next, the same procedure as in Synthesis Example 7 was repeated except for using 70 parts of the low-molecular weight polymer-3, 0.8 part of t-butylperoxy-2-ethylhexanoate, to obtain a pearl-like comparative resin composition-7. This resin composition had a gel component of 36 wt.%, with the main peak value of the eluted component being 28000, and the sub-peak value 98000.

COMPARATIVE SYNTEHSIS EXAMPLE 8

Synthesis Example 7 was repeated except for adding 15 parts of the low-molecular weight-1 in Synthesis Example 7, 2.2 parts of divinylbenzene and 2 parts of t-butylperoxy-2-ethylhexanoate as the initiator, to obtain a pearl-like comparative resin composition-8. This resin composition had a gel component of 76 wt. %, with the main peak value of the eluted component being 8000, and the sub-peak value 86000.

COMPARATIVE SYNTHESIS EXAMPLE 9

Figure 11:
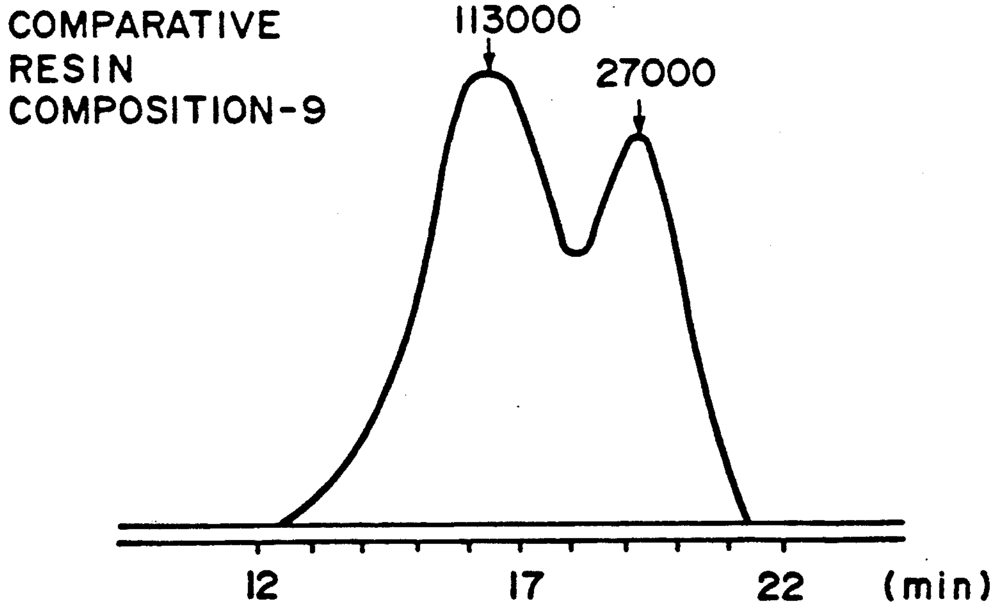
FIG. 11 shows a chromatogram of the THF-soluble of the binder resin used in Comparative Example 9.

In synthesis of the low-molecular weight polymer, without use of α-methylstyrene and by use of correspondingly increased amount of styrene and 2.5 parts of benzoyl peroxide, and following otherwise the same procedure for synthesis of the low-molecular weight polymer-1 as in Synthesis Example 7, a low-molecular weight polymer-4 was obtained. Next, the same procedure as in Synthesis Example 7 was repeated except for using 70 parts of the low-molecular weight polymer-4 and 0.6 part of t-butylperoxy-2-ethylhexanoate, to obtain a pearl-like comparative resin composition-9. This resin composition had a gel component of 32 wt. %, with the main peak value of the eluted component being 113000, and the sub-peak value 27000. FIG. 11 shows the GPC chart of the eluted component.

COMPARATIVE SYNTEHSIS EXAMPLE 10

The procedure of Comparative Synthesis Example 7 was repeated except for using 70 parts of the low-molecular weight polymer-3 and 0.5 part of t-butylperoxy-2-ethylhexanoate, to obtain a pearl-like comparative resin composition-10. This resin composition had a gel component of 40 wt. %, with the main peak value of the eluted component being 23000, and the sub-peak value 195000.

SYNTHESIS EXAMPLE 12

A pearl-like resin composition-12 was obtained in the same manner as in Synthesis Example 7 except for using 20 parts of the low-molecular weight polymer-1 in Synthesis Example 7, 1.3 parts of divinylbenzene and 4.5 parts of benzoyl peroxide as the initiator in the suspension polymerization. This resin composition had a gel component of 45 wt. %, with the main peak value of the eluted component being 25000, and the shoulder value 5000.

SYNTEHSIS EXAMPLE 13

A pearl-like resin composition-13 was obtained in the same manner as in Synthesis Example 7 except for using 1.3 parts of triethylene glycol diacrylate and 4.5 parts of benzoyl peroxide as the initiator in the suspension polymerization. This resin composition had a gel component of 41 wt. %, with the main peak value of the eluted component being 5000, and the shoulder value 36000.

SYNTHESIS EXAMPLE 14

A low molecular weight polymer-5 was obtained in the same manner as in synthesis of the low molecular weight polymer-1 is Synthesis Example 7 except for using 15 parts of 2-ethylhexyl acrylate and 75 parts of styrene. Next, except for using 70 parts of the low molecular weight polymer-5, Synthesis Example 7 was repeated to obtain a pearl-like resin composition-14. This resin composition had a gel component of 29 wt. %, with the main peak value of the eluted component being 5500, and the sub-peak value 48000.

The proportions of the component A, the component B and the component C of the vinyl polymers obtained in the respective synthesis examples are shown in Table 3.

TABLE 3

| | | Component A | Component B | Component C |
|---|---|---|---|---|
| Synthesis Example | 7 | 9 (%) | 28 (%) | 63 (%) |
| " | 8 | 4 | 37 | 59 |
| " | 9 | 7 | 31 | 62 |
| " | 10 | 5 | 23 | 72 |
| " | 11 | 6 | 29 | 65 |
| Comparative Synthesis Example | 6 | 1 | 3 | 96 |
| " | 7 | 9 | 40 | 51 |
| " | 8 | 8 | 30 | 62 |
| " | 9 | 9 | 60 | 31 |
| " | 10 | 6 | 41 | 53 |
| Synthesis Example | 12 | 9 | 56 | 35 |
| " | 13 | 8 | 28 | 64 |
| " | 14 | 1 | 11 | 88 |

EXAMPLE 7

| | |
|---|---|
| Resin composition-7 | 100 parts |
| Magnetite | 60 parts |

-continued

| | |
|---|---|
| Low-molecular weight polypropylene | 4 parts |
| Nigrosine | 2 parts |

The above materials were blended well by a blender, and then kneaded on two rollers heated to 150° C. After the kneaded product was left to cool, crushed by a cutter mill, then pulverized by a micropulverizer by use of jet air stream, and further classified by means of a wind-force classifier to obtain black fine powder with a volume-average particle size of 11 to 12 μm. The black fine powder was mixed with 0.5 part by weight of silica produced by the wet process per 100 parts by weight thereof in a Henschel mixer to form a toner. The toner was subjected to successive copying of 3000 sheets by use of a copying machine (NP-3525 produced by Canon K.K.) in which an OPC photosensitive member was used. As the result, sharp images of high resolution with image density of ( 1.2–1.3 without fog were obtained. Further, by use of the fixer for the NP-3525 copying machine and by varying the fixing roller temperature, investigations were made about offset, fixability, and winding. As the result, as shown in Table 4, no offset was generated from 140° C. up to 230° C., and fixability at 150° C. was also good without generation of winding around rollers. The kneaded product for toner was found to be excellent also in pulverizability and anti-blocking characteristic by the test at a temperature of 50° C. for one day.

EXAMPLE 8

A toner was prepared in the same manner as in Example 7 except for using 100 parts of the resin composition-8, and successive copying of 3000 sheets was conducted by use of a copying machine (NP-3525 produced by Canon K.K.), to give sharp images of high resolution with image density of 1.2–1.3 without fog. Further, by use of the NP-3525 fixer and by varying the fixing roller temperature, investigations were made about offset, fixability, and winding. As the result, as shown in Table 4, no offset was generated from 140° C. up to 230° C., and fixability at 150° C. was also good without generation of winding around rollers. The kneaded product for toner was found to be good also in pulverizability and anti-blocking characteristic by the test at a temperature of 50° C. for one day.

EXAMPLE 9

A toner was prepared in the same manner as in Example 7 except for using 100 parts of the resin composition-9, and successive copying of 3000 sheets was conducted by use of a copying machine (NP-3525 produced by Canon K.K.), to give sharp images of high resolution with image density of 1.25–1.35 without fog. With the use of NP-3525 fixer, by varying the fixing roller temperature, investigations were made about offset and fixability, winding. As the result, as shown in Table 4, no offset was generated from 140° C. up to 230° C., and fixability at 150° C. was also good without generation of winding around rollers. Further, there was no problem in anti-blocking characteristic by the test at a temperature of 50° C. for one day, and also the kneaded product for toner was found to be excellent in pulverizability.

EXAMPLE 10

After 100 parts of the resin composition-10, 60 parts of magnetite, 4 parts of a low molecular weight polypropylene and 2 parts of a salicylic chromium type complex compound were blended well by a blender, the blend was kneaded on two rollers heated to 150° C. After the kneaded product was left to cool, crushed by a cutter mill, then pulverized by a micropulverizer by use of jet air stream, and further classified by means of a wind-force classifier to obtain black fine powder with a volume average particle size 11 to 12 μm. The black fine powder was mixed with 0.4 part by weight of dry process silica subjected to hydrophobicity modification per 100 parts by weight of the black fine powder in a Henschel mixer to form a toner. The toner was subjected to successive copying of 3000 sheets by use of a copying machine (NP-7550 produced by Canon K.K.) in which an amorphous silicon photosensitive member was used. As the result, sharp images of high resolution with image density of 1.2–1.3 without fog were obtained. Further, by use of the fixer for the NP-7550 copying machine and by varying the fixing roller temperature, investigations were made about off-set, fixability and winding. As the result, as shown in Table 4, no offset was generated from 140° C. up to 230° C., and fixability at 150° C. was also good without generation of winding around rollers. There was no problem in anti-blocking characteristic under the conditions of a temperature of 50° C. for one day, and also the kneaded product for toner was found to be excellent in pulverizability.

EXAMPLE 11

A toner was prepared in the same manner as in Example 7 except for using 100 parts of the resin composition-11, and successive copying of 3000 sheets was conducted by use of the NP-3525 copying machine to give sharp images of high resolution with image density of 1.15–1.3 without fog. With the use of the NP-3525 fixer, by varying the fixing roller temperature, investigations were made about offset, fixability and winding. As the result, as shown in Table 4, no offset was generated from 140° C. up to 230° C., and fixability at 150° C. was also good without generation of winding around rollers. Further, there was no problem in anti-blocking characteristic under the conditions of a temperature of 50° C. for one day, and also the kneaded product for toner was found to be excellent in pulverizability.

EXAMPLE 12

A toner was prepared in the same manner as in Example 7 except for using 100 parts of the resin composition-12, and successive copying of 3000 sheets was conducted by use of the NP-3525 copying machine to give sharp images of high resolution with image density of 1.2–1.3 without fog. With the use of the NP-3525 fixer, by varying the fixing roller temperature, investigations were made about offset, fixability and winding. As the result, as shown in Table 4, no offset was generated from 140° C. up to 230° C., and fixability at 150° C. was also good without generation of winding around rollers. Further, there was no problem in anti-blocking characteristic under the conditions of a temperature of 50° C. for one day, and also the kneaded product for toner was found to be satisfactory in pulverizability.

EXAMPLE 13

A toner was prepared in the same manner as in Example 7 except for using 100 parts of the resin composition-13, and successive copying of 3000 sheets was conducted by use of the NP-3525 copying machine to give sharp images of high resolution with image density of 1.15–1.3 without fog. With the use of the NP-3525 fixer, by varying the fixing roller temperature, investigations were made about offset, fixability and winding. As the result, as shown in Table 4, no offset was generated from 140° C. up to 230° C., and fixability at 150° C. was also good without generation of winding around rollers. Further, there was no problem in anti-blocking characteristic under the conditions of a temperature of 50° C. for one day, and also the kneaded product for toner was found to be excellent in pulverizability.

EXAMPLE 14

A toner was prepared in the same manner as in Example 7 except for using 100 parts of the resin composition-14, and successive copying of 3000 sheets was conducted by use of the NP-3525 copying machine to give sharp images of high resolution with image density of 1.15–1.25 without fog. With the use of NP-3525 fixer, by varying the fixing roller temperature, investigations were made about offset, fixability and winding. As the result, as shown in Table 4, no offset was generated from 140° C. up to 230° C., and fixability at 150° C. was also good without generation of winding around rollers. Further, there was no problem in anti-blocking characteristic under the conditions of a temperature of 50° C. for one day, and also the kneaded product for toner was found to be excellent in pulverizability.

COMPARATIVE EXAMPLE 6

A toner was prepared in the same manner as in Example 7 except for using 100 parts of the comparative resin composition-7, and successive copying of 3000 sheets was conducted by use of the NP-3525 copying machine, to give sharp images of high resolution with image density of 1.2–1.3 without fog. However, as shown in Table 5, in evaluation of anti-offset characteristic, fixability and winding by use of the NP-3525 fixer, fixability at 150° C. had no problem, but offset at 140° C. and offset at 230° C. were noticeable, with winding around rollers being generated. Further, under the conditions of 50° C. and one day, blocking of toner was confirmed.

COMPARATIVE EXAMPLE 7

A toner was prepared in the same manner as in Example 7 except for using 100 parts of the comparative resin composition-7, and successive copying of 3000 sheets was conducted by use of the NP-3525 copying machine, to give sharp images of high resolution with image density of 1.1–1.2 without fog. In evaluation of anti-offset characteristic, fixability and winding by the NP-3525 fixer, although no offset or winding at 230° C., blocking at 50° C. for one day was generated, it was found that offset was generated at 140° C. as shown in Table 5, the fixability at 150° C. was poor, and the pulverizability of the kneaded product for toner was found to be remarkably inferior.

COMPARATIVE EXAMPLE 8

A toner was prepared in the same manner as in Example 7 except for using 100 parts of the comparative resin composition-8, and successive copying of 3000 sheets was conducted by use of the NP-3525 copying machine, whereby only images with a shade of fog and with low image density of 0.95–1.15 could be obtained. In evaluation of offset, fixability, winding by the NP-3525 fixer, there was no problem in offset, winding at 230° C. or anti-blocking characteristic at 50° C. for one day, but fixability at 150° C. and offset at 140° C. were poor, and further the pulverizability of the kneaded product for toner was not satisfactory.

COMPARATIVE EXAMPLE 9

A toner was prepared in the same manner as in Example 7 except for using 100 parts of the comparative resin composition-9, and successive copying of 3000 sheets was conducted by use of the NP-3525 copying machine whereby only images with a shade of fog and with low image density of 1.1–1.2 could be obtained. In evaluation of offset, fixability and winding by the NP-3525 fixer, no offset at 230° C., further no blocking or winding around rollers under the conditions of 50° C. and one day was generated, but both offset at 140° C. and fixability at 150° C. were poor, and further the pulverizability of the kneaded product for toner was remarkably bad.

COMPARATIVE EXAMPLE 10

A toner was prepared in the same manner as in Example 7 except for using 100 parts of the comparative resin composition-10, and successive copying of 3000 sheets was conducted by use of the NP-3525 copying machine, whereby images obtained had no fog but low image density of 1.05–1.15. In evaluation of offset, fixability and winding by the NP-3525 fixer, no offset at 230° C., no blocking or winding around rollers under the conditions of 50° C. and one day was generated, but both offset at 140° C. and fixability at 150° C. were poor, and further the pulverizability of the kneaded product for toner was remarkably bad.

The results are summarized in the following Tables 4 and 5.

TABLE 4

| | Anti-offset characteristic | | Fixability | Anti-winding | Anti-blocking char. | |
|---|---|---|---|---|---|---|
| Example | 140° C. | 230° C. | 150° C. | characteristic | 50° C. one day | Pulverizability |
| 7 | ◎ | ◎ | ◎ | ○ | ○ | ○ |
| 8 | ○ | ○ | ◎ | ○ | ○ | ○ |
| 9 | ◎ | ◎ | ◎ | ○ | ○ | ○ |
| 10 | ○ | ◎ | ○ | ○ | ○ | ○ |
| 11 | ◎ | ◎ | ◎ | ○ | ○ | ○ |
| 12 | ○ | ○ | Δ | ○ | ○ | Δ |
| 13 | ◎ | ◎ | ◎ | ○ | ○ | ○ |
| 14 | ◎ | ◎ | ◎ | ○ | ○ | ○ |

TABLE 5

| Example | Anti-offset characteristic 140° C. | 230° C. | Fixability 150° C. | Anti-winding characteristic | Anti-blocking char. 50° C. one day | Pulverizability |
|---|---|---|---|---|---|---|
| 6 | x | x | ∘ | x | x | ∘ |
| 7 | x | ⊚ | x | ∘ | ∘ | x |
| 8 | x | ∘ | Δ | ∘ | ∘ | Δ |
| 9 | x | ⊚ | x | ∘ | ∘ | x |
| 10 | x | x | x | ∘ | ∘ | x |

EXAMPLE 15

Into a reactor, 200 parts by weight of cumene was charged and the temperature was raised to the reflux temperature. To the system was added dropwise a mixture of 100 parts by weight of styrene monomer and 8 parts of di-tert-butyl peroxide under cumene reflux over 4 hours. Further, under cumene reflux (146° C.-156° C.), solution polymerization was completed, and cumene was removed. The polystyrene obtained was found to be soluble in THF, with Mw=3700, Mw/Mn=2.64, and the main peak of GPC was positioned at a molecular weight of 3500, with Tg=57° C.

The above polystyrene (30 parts by weight) was dissolved in the monomer mixture shown below to provide a mixed solution.

| Monomer mixture | Formulated ratio |
|---|---|
| Styrene monomer | 54 wt. parts |
| n-Butyl acrylate monomer | 16 " |
| Divinylbenzene | 0.3 " |
| Benzoyl peroxide | 1.4 " |

Into the above mixed solution, 170 parts by weight of water containing 0.1 part by weight of a partially saponified polyvinyl alcohol dissolved therein was added to form a suspension. The above suspension was added into a reactor charged with 15 parts by weight of water and replaced with nitrogen, and suspension polymerization was carried out at a reaction temperature of 70° to 95° C. for 6 hours. After completion of the reaction, the product was filtered off, dehydrated and dried to give a composition of a polystyrene and a styrene-n-butyl acrylate copolymer. This composition contained THF-insoluble and THF-soluble homogeneously mixed therein, and the polystyrene and the styrene-n-butyl acrylate copolymer were found to be homogeneously mixed. The content of the THF-insoluble (measured as the powder of 24 mesh pass, 60 mesh on) was 25 wt.%. The molecular weight distribution of THF soluble was measured to give the result that there were peaks at the positions of about $0.4\times10^4$ and about $3.4\times10^4$ in the GPC chart, with $Mn=0.55\times10^4$, $Mw=13\times10^4$, Mw/Mn=24, and the molecular weights of $10^4$ or lower being 25 wt.%. Further, Tg of the resin was 58° C., and the glass transition point $Tg_1$ of the components of $10^4$ or less separated by GPC was 57° C.

Figure 12:
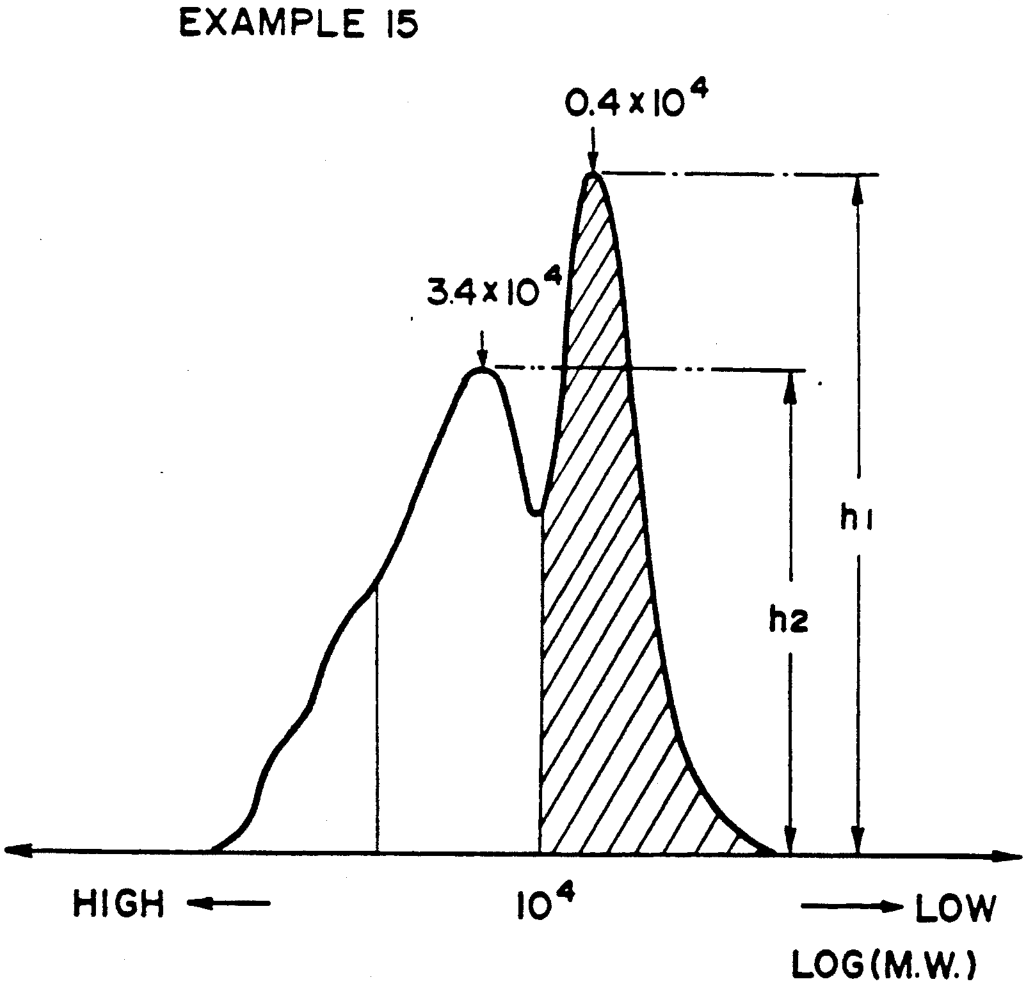
FIG. 12 shows a chart of GPC of the THF-soluble of the resin composition prepared in Example 15.

FIG. 12 shows the GPC chromatogram of the THF-soluble. The chromatogram in FIG. 12 was very approximate to the chromatogram in FIG. 1.

The characteristics concerning molecular weights of the respective resins and resin compositions were measured according to the following method.

By use of shodex KF-80M as the column for GPC measurement, it was assembled in the heat chamber of 40° C. of a GPC measuring device (150C ALC/GPC produced by Waters Co.), and GPC operation was effected by injecting 200 μl of a sample (about 0.1 wt.% concentration of THF-soluble) under the condition of THF flow rate of 1 ml/min and by using an RI for the detector. As the calibration curve for molecular weight measurement, THF solutions of mono-dispersed polystyrene standard materials (produced by Waters Co.) of the 10 points of molecular weights of $0.5\times10^3$, $2.35\times10^3$, $10.2\times10^3$, $35\times10^3$, $110\times10^3$, $200\times10^3$, $470\times10^3$, $1200\times10^3$, $2700\times10^3$ and $8420\times10^3$ were used.

EXAMPLE 16

Into a reactor, 200 parts by weight of cumene was charged, and the temperature was raised to the reflux temperature. The following mixture was added dropwise under cumene reflux over 4 hours.

| Monomer mixture | Formulated ratio |
|---|---|
| Styrene monomer | 95 wt. parts |
| α-Methylstyrene monomer | 5 " |
| Di-tert-butylperoxide | 8 " |

Further, polymerization was completed under cumene reflux (146°-156° C.) and the cumene was removed. The styrene-α-methylstyrene copolymer obtained had Mw=4500, Mw/Mn=2.8, a main peak at a molecular weight of 4400, and Tg=63° C.

The above styrene-α-methylstyrene copolymer (30 parts by weight) was dissolved in the following monomer mixture to provide a mixed solution.

| Monomer mixture | Formulated ratio |
|---|---|
| Styrene monomer | 55 wt. parts |
| 2-Ethylhexyl acrylate | 15 " |
| Divinylbenzene | 0.3 " |
| Benzoyl peroxide | 1.4 " |

Into the above mixture, 170 parts by weight of water containing 0.1 part by weight of a partially saponified polyvinyl alcohol dissolved therein was added to form a suspension.

The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a composition of a styrene-α-methylstyrene copolymer and a styrene-2-ethylhexyl acrylate copolymer.

The content of the THF-insoluble in this composition was 32 wt.%. The molecular weight distribution of THF-soluble was measured to give the result that there were peaks at the positions of $0.5\times10^4$ and $4.2\times10^4$, with $Mn=0.62\times10^4$, $Mw=13\times10^4$, Mw/Mn=21, and the molecular weights of $10^4$ or lower being 20 wt. %. Further, Tg of the resin was 58° C., and the glass transition point $Tg_1$ of the components of $10^4$ or less separated by GPC was 60° C.

EXAMPLE 17

Into a reactor, 200 parts by weight of cumene was charged, and the temperature was raised to the reflux temperature. The following mixture was added dropwise under cumene reflux over 4 hours.

| Monomer mixture | Formulated ratio |
|---|---|
| Styrene monomer | 90 wt. parts |
| Methyl methacrylate monomer | 10 " |
| Di-tert-butyl peroxide | 8 " |

Further, polymerization was completed under cumene reflux (146°-156° C.) and cumene was removed. The styrene-methyl methacrylate copolymer obtained had Mw=3900, Mw/Mn=2.6, a main peak at a molecular weight of 4100, and Tg=60° C.

The above styrene-methyl methacrylate copolymer (40 parts by weight) was dissolved in the following monomer mixture to provide a mixed solution.

| Monomer mixture | Formulated ratio |
|---|---|
| Styrene monomer | 38 wt. parts |
| n-Butyl methacrylate monomer | 22 " |
| Divinylbenzene | 0.24 " |
| Benzoyl peroxide | 0.65 " |
| tert-Butylperoxy-2-ethylhexanoate | 0.85 " |

Into the above mixture, 170 parts by weight of water containing 0.1 part by weight of a partially saponified polyvinyl alcohol dissolved therein was added to form a suspension. The above suspension was added into a reactor charged with 15 parts by weight of water and replaced with nitrogen, and the reaction was carried out at a temperature of 70 to 95° C. for 6 hours. After completion of the reaction, the product was filtered, dehydrated and dried to give a composition of a styrene-methyl methacrylate copolymer and a styrene-n-butyl methacrylate copolymer.

The content of the THF-insoluble in this composition was 35 wt. %. The molecular weight distribution of THF-soluble was measured to give the result that there were peaks at the positions of $0.4\times10^4$ and $4.3\times10^4$, with $Mn=0.59\times10^4$, $Mw=9.2\times10^4$, Mw/Mn=16, and the molecular weights of $10^4$ or lower being 32 wt. %. Further, Tg of the resin was 60° C., and the glass transition point $Tg_1$ of the components of $10^4$ or less separated by GPC was 58° C.

EXAMPLE 18

Into a reactor, 200 parts by weight of cumene was charged and the temperature was raised to the reflux temperature. The following mixture was added dropwise under cumene reflux over 4 hours.

| Monomer mixture | Formulated ratio |
|---|---|
| Styrene monomer | 100 wt. parts |
| Di-tert-butyl peroxide | 8 " |

Further, polymerization was completed under cumene reflux (146°-156° C.) and cumene was removed. The polystyrene obtained had Mw=3700, Mw/Mn=2.64, a main peak at a molecular weight of 3500, and Tg=57° C.

The above polystyrene (30 parts by weight) was dissolved in the following monomer mixture to provide a mixed solution.

| Monomer mixture | Formulated ratio |
|---|---|
| Styrene monomer | 55 wt. parts |
| n-Butyl acrylate monomer | 15 " |
| Divinylbenzene | 0.14 " |
| tert-Butylperoxy-2-ethylhexanoate | 1.6 " |

Into the above mixture, 170 parts by weight of water containing 0.1 part by weight of a partially saponified polyvinyl alcohol dissolved therein was added to form a suspension. The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a composition of a polystyrene and a styrene-n-butyl acrylate copolymer.

The content of the THF-insoluble in this composition was 44 wt. %. The molecular weight distribution of THF-soluble was measured to give the result that there were peaks at the positions of $0.4\times10^4$ and $7.0\times10^4$, with $Mn=0.58\times10^4$, $Mw=10\times10^4$, Mw/Mn=17, and the molecular weights of $10^4$ or lower being 21 wt. %. Further, Tg of the resin was 56° C., and the glass transition point $Tg_1$ of the components of $10^4$ or less separated by GPC was 56° C.

EXAMPLE 19

Into a reactor, 150 parts by weight of cumene was charged, and the temperature was raised to the reflux temperature. The following mixture was added dropwise under cumene reflux over 4 hours.

| Monomer mixture | Formulated ratio |
|---|---|
| Styrene monomer | 100 wt. parts |
| Di-tert-butylperoxide | 4 " |

Further, polymerization was completed under cumene reflux (146°-156° C.) and the cumene was removed. The styrene-n-butyl acrylate copolymer obtained had Mw=6900, Mw/Mn=2.3, a main peak at a molecular weight of 7100 and Tg=75° C.

The above polystyrene (30 parts by weight) was dissolved in the following monomer mixture to provide a mixed solution.

| Monomer mixture | Formulated ratio |
|---|---|
| Styrene monomer | 52 wt. parts |
| n-Butyl acrylate monomer | 18 " |
| Divinylbenzene | 0.3 " |
| Benzoyl peroxide | 1 " |
| tert-Butylperoxy-2-ethylhexanoate | 1.6 " |

Into the above mixture, 170 parts by weight of water containing 0.1 part by weight of a partially saponified polyvinyl alcohol dissolved therein was added to form a suspension. The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a composition of a styrene-n-butyl acrylate copolymer and a styrene-n-butyl methacrylate.

The content of the THF-insoluble in this composition was 30 wt. %. The molecular weight distribution of THF-soluble was measured to give the result that there were peaks at the positions of $0.75\times10^4$ and $4.3\times10^4$, with $Mn=0.65\times10^4$, $Mw=10\times10^4$, $Mw/Mn=15$, and the molecular weights of $10^4$ or lower being 18 wt. %. Further, Tg of the resin was 61° C., and the glass transition point $Tg_1$ of the components of 104 or less separated by GPC was 70° C.

COMPARATIVE EXAMPLE 11

| Monomer mixture | Formulated ratio |
|---|---|
| Styrene monomer | 77 wt. parts |
| n-Butyl acrylate monomer | 23 " |
| Divinylbenzene | 0.4 " |
| Benzoyl peroxide | 0.75 " |
| tert-Butylperoxy-2-ethylhexanoate | 1.8 " |

Into the above mixture, 170 parts by weight of water containing 0.1 part by weight of a partially saponified polyvinyl alcohol dissolved therein was added to form a suspension. The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a styrene-n-butyl acrylate copolymer.

The content of the THF-insoluble in this composition was 58 wt.%. The molecular weight distribution of THF-soluble was measured to give the result that there was only a peak at $4.0\times10^4$, with $Mn=1.4\times10^4$, $Mw=11\times10^4$, $Mw/Mn=8$.

COMPARATIVE EXAMPLE 12

Into a reactor, 200 parts by weight of cumene was charged, and the temperature was raised to the reflux temperature. To this was added dropwise a mixture of 100 parts by weight of styrene and 8 parts by weight of di-tert-butyl peroxide under cumene reflux over 4 hours. Further, polymerization was completed under cumene reflux (146°-156° C.) and cumene was removed. The polystyrene obtained had $Mw=3700$, $Mw/Mn=2.64$, a main peak at a molecular weight of 3500, and $Tg=57°$ C.

The above polystyrene (30 parts by weight) was dissolved in the following monomer mixture to provide a mixed solution.

| Monomer mixture | Formulated ratio |
|---|---|
| Styrene monomer | 54 wt. parts |
| n-Butyl acrylate monomer | 16 " |
| Divinylbenzene | 1.5 " |
| Benzoyl peroxide | 1 " |

Into the above mixture, 170 parts by weight of water containing 0.1 part by weight of a partially saponified polyvinyl alcohol dissolved therein was added to form a suspension. The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a composition of a polystyrene and a styrene-n-butyl acrylate copolymer.

The content of the THF-insoluble in this composition was 75 wt. %. The molecular weight distribution of THF-soluble was measured to give the result that there were peaks at the position of $0.34\times10^4$, with $Mn=0.21\times10^4$, $Mw=0.42\times10^4$, $Mw/Mn=2$, and the molecular weights of $10^4$ or lower being 18 wt. %. Further, Tg of the resin was 58° C., and the glass transition point $Tg_1$ of the components of $10^4$ or less separated by GPC was 57° C.

COMPARATIVE EXAMPLE 13

Into a reactor, 200 parts by weight of cumene was charged, and the temperature was raised to the reflux temperature. To this was added dropwise a mixture of 100 parts by weight of styrene and 8 parts by weight of di-tert-butylperoxide under cumene reflux over 4 hours. Further, polymerization was completed under cumene reflux (146°-156° C.) and cumene was removed. The polystyrene obtained had $Mw=5700$, $Mw/Mn=2.65$, a main peak at a molecular weight of 5300, and $Tg=56°$ C.

The above polystyrene (30 parts by weight) was dissolved in the following monomer mixture to provide a mixed solution.

| Monomer mixture | Formulated ratio |
|---|---|
| Styrene monomer | 54 wt. parts |
| n-Butyl acrylate monomer | 16 " |
| Divinylbenzene | 0.14 " |
| tert-Butylperoxy-2-ethylhexanoate | 1.0 " |

Into the above mixture, 170 parts by weight of water containing 0.1 part by weight of a partially saponified polyvinyl alcohol dissolved therein was added to form a suspension. The above suspension was added into a reactor charged with 15 parts by weight of water and replaced with nitrogen, and the reaction was carried out at a temperature of 70° to 95° C. for 6 hours. After completion of the reaction, the product was filtered, dehydrated and dried to give a composition of a polystyrene and a styrene-n-butyl acrylate copolymer.

The content of the THF-insoluble in this composition was 30 wt. %. The molecular weight distribution of THF-soluble was measured to give the result that there were peaks at the positions of $0.4\times10^4$ and $15\times10^4$, with $Mn=0.60\times10^4$, $Mw=25\times10^4$, $Mw/Mn=42$, and the molecular weights of $10^4$ or lower being 22 wt. %. Further, Tg of the resin was 56° C., and the glass transition point $Tg_1$ of the components of $10^4$ or less separated by GPC was 56° C.

PREPARATION EXAMPLE 1

The resin composition of Example 15 (100 parts by weight), 60 parts by weight of a magnetic material, 4 parts by weight of a low molecular weight polypropylene and 2 parts by weight of a positive charge controller were thermally kneaded, and a toner was prepared by use of a micropulverizer and a classifying device.

The pulverizability of the toner starting material was very good, and the treated μmount for obtaining a volume-average size as the pulverized particle size of 10 μ was a value of 15.3 kg/hr. Also, there was no sticking in the pulverizer.

A developer comprising 100 parts by weight of the toner mixed with 0.4 part by weight of a hydrophobic silica was charged into a copying machine (NP-5540 produced by Canon), and image quality and fixability were evaluated.

As the result of successive copying of 50000 sheets, stable and good images were formed. Further, fixability was also good, with good anti-offset characteristic and anti-winding characteristic. Further, there was no filming or sticking onto the photosensitive member.

PREPARATION EXAMPLE 2

Preparation 1 was repeated except for using the resin composition of Example 16 to obtain substantially the same results as in Preparation Example 1.

PREPARATION EXAMPLES 3-5, COMPARATIVE PREPARATION EXAMPLES 1-4

Toners were prepared in the same manner as in Preparation Example 1 except for using the resin compositions of Examples 17, 18 and 19 (Preparation Examples 3-5). On the other hand, toners were prepared in the same manner as in Preparation Example 1 except for using the polystyrene used as the starting material for the resin composition in Example 15, and the resin compositions of Comparative Examples 11, 12 and 13, respectively (Comparative Preparation Examples 1-4).

EVALUATIONS METHODS

Pulverizability of the toner starting material was evaluated by the amount treated per unit time under an air pressure of 5.5 kg/cm$^2$ by a micropulverizer by use of jet air steam as a measure.

Fixability, anti-offset characteristic, anti-winding characteristic and image quality, successive copying characteristic were examined by use of a copying machine (NP-5540 produced by Canon K.K.).

Particularly, anti-offset characteristic was examined by lowering the set temperature in the fixer by 5° C., dismantling the cleaning mechanism in the fixing roller and observing whether the image was contaminated or the roller was contaminated.

Fixability was measured by rubbing the image with Silbon C paper reciprocally for 10 times under a load of about 100 g and representing the peeling of the image in terms of a lowering in percentage the reflective density. The evaluation of image was conducted on a 200-th sheet when successive copying of 200 sheets was conducted.

Anti-winding characteristic was measured by forming 3 sheets of the whole surface black image and by observing the trace of a pawl for peeling attached to the fixing roller remaining oh the copies to judge how the peeling relied on the action of the pawl.

TABLE 6

| | Pulverizability (kg/hr) | Sticking in pulverizer | Successive developing char. | Fixability | Anti-offset char. | Anti-winding char. |
|---|---|---|---|---|---|---|
| Preparation Example 1 | Very good (15.3) | None | Good for 50000 sheets | Very good | Good | Good |
| Preparation Example 2 | Very good (14) | " | Good for 50000 sheets | " | " | " |
| Preparation Example 3 | Very good (16) | " | Good for 50000 sheets | " | " | " |
| Preparation Example 4 | Good (13.5) | " | Good for 50000 sheets | Good | " | " |
| Preparation Example 5 | Good (13.7) | " | Good for 50000 sheets | " | " | " |
| Comparative Preparation Example 1* | Very good (25) | Observed | Troubled** after 1000 sheets | Very good | Very bad | Very bad |
| Comparative Preparation Example 2 | Very poor (3) | None | Good for 50000 sheets | Very bad | Bad | Good |
| Comparative Preparation Example 3 | Very good (16.2) | " | Troubled** after 10000 sheets | Bad | " | " |
| Comparative Preparation Example 4 | Very poor (5) | " | Good for 50000 sheets | Very bad | " | " |

*Slight filming on photosensitive member was also observed.
**Image density remarkably lowered after the indicated number of sheets.

What is claimed is:

1. A binder resin for a toner comprising a polymer or a copolymer obtained by polymerization of at least one monomer selected from styrene monomers, acrylic acid monomers, methacrylic acid monomers and derivatives thereof, said binder resin having 10 to 70 wt. % of a THF (tetrahydrofuran)-insoluble component and 30-90 wt. % of a THF-soluble component; the THF-soluble component having a molecular weight distribution in a GPC chromatogram thereof which provides at least one peak in the molecular weight range of 2,000 to 10,000 and at least one peak or shoulder in the molecular weight range of 15,000 to 100,000; wherein the ratio Mw/Mn of weight-average molecular weight (Mw) to number-average molecular weight (Mn) for the THF soluble component is $\geqq 5$; and wherein components having molecular weights of 10,000 or less are contained in a proportion of 10-50 wt. % of the binder resin.

2. A binder resin according to claim 1, wherein the components having molecular weights of 10,000 or less are contained in a proportion of 20-90 wt.%; and the THF-soluble component has, in the GPC chromatogram thereof, a peak in the molecular weight range of 2,000 to 8,000, and a peak in the molecular weight range of 20,000 to 70,000.

3. A binder resin according to claim 1, wherein the THF-soluble component has an Mw/Mn ratio of 5-80.

4. A binder resin according to claim 1, wherein the THF-soluble component has an Mw/Mn ratio of 10-60.

5. A binder resin according to claim 1, wherein the THF-insoluble component is contained in a proportion of 10–60 wt.%.

6. A binder resin according to claim 1, wherein the THF-soluble component of the binder resin satisfies the following relationship;

$$Tg_1 \geqq Tg_t - 5,$$

wherein $Tg_1$ denotes the glass transition point (° C.) of the components having molecular weights of 10,000 or less in the THF-soluble component and $Tg_t$ denotes the glass transition point (° C.) of the toner.

7. A binder resin according to claim 1, wherein the THF-soluble component has a ratio $h_1/h_2$ in the range of 0.4/1 to 4.0/1 in the GPC chromatogram thereof, wherein $h_1$ denotes the height of the highest peak in the molecular weight range of 2,000 to 10,000, and $h_2$ denotes the height of the highest peak in the molecular weight range of 15,000 to 100,000.

8. A binder resin according to claim 1, wherein the THF-insoluble component comprises a crosslinked polymer or copolymer.

9. A binder resin according to claim 8, wherein the THF-insoluble component comprises a copolymer of styrene or a derivative thereof.

10. A binder resin according to claim 1, wherein the THF-insoluble component is formed by subjecting a monomer composition comprising a polymerizable monomer and a first polymer dissolved therein to suspension polymerization in the presence of a crosslinking agent; the first polymer having a glass transition point of 50° C. or higher and providing a molecular weight distribution thereof according to GPC such that there is a main peak in the molecular weight range of 2,000 to 10,000 and is provides a ratio (Mw/Mn) of weight-average molecular weight (Mw)/number-average molecular weight (Mn)$\leqq$3.5.

11. A binder resin according to claim 1, wherein said polymer or said copolymer is obtained by further polymerization with a small amount of other ethylenically unsaturated monomers.

12. A binder resin according to claim 1, wherein the binder resin comprises 0–20 wt. % of a component in a molecular weight region of $50\times10^4$ or higher, 10–60 wt. % of a component in a molecular weight region of $3\times10^4$–$50\times10^4$, and 20–90 wt. % of a component in a molecular weight region of $3\times10^4$ or lower, based on its GPC chromatogram.

13. A binder resin according to claim 12, wherein the binder resin contains a component having a molecular weight of $30\times10^4$ or higher in a proportion of 3 to 25 wt. % of binder resin.

* * * * *

UNITED STATES PATENT AND TRADEMARK OFFICE

CERTIFICATE OF CORRECTION

PATENT NO. : 5,219,947
DATED : June 15, 1993
INVENTOR(S) : SATOSHI YASUDA, ET AL.

It is certified that error appears in the above-identified patent and that said Letters Patent is hereby corrected as shown below:

On the title page: Item
56] REFERENCES CITED

Under U.S. PATENT DOCUMENTS:
"3,340,660" should read --4,340,660--.

COLUMN 3

Line 4, "higher" should read --higher the--.
Line 32, "deocmposition" should read --decomposition--.
Line 40, "poly-o-methylstyrene" should read --poly-$\alpha$-methylstyrene--.

COLUMN 4

Line 17, "to" should read --to the--.
Line 36, "of" should read --of the--.
Line 64, "for" should read --for a--.

COLUMN 5

Line 58, "(tetrahydrofuran)insoluble" should read --(tetrahydrofuran)-insoluble--.

COLUMN 6

Line 22, "THF soluble" should read --THF-soluble--.
Line 65, "(-broken" should read --(broken--.

UNITED STATES PATENT AND TRADEMARK OFFICE

CERTIFICATE OF CORRECTION

PATENT NO. : 5,219,947

DATED : June 15, 1993

INVENTOR(S) : SATOSHI YASUDA, ET AL.

It is certified that error appears in the above-identified patent and that said Letters Patent is hereby corrected as shown below:

COLUMN 9

Line 31, "TSKgel," should read --TSKgel--.

COLUMN 10

Line 4, "other" should read --other than--.

COLUMN 13

Line 65, "is" should read --are--.

COLUMN 14

Line 48, "adeversely" should read --adversely--.
Line 61, "below. (1)" should read --below. ¶ (1)--.

COLUMN 15

Line 8, "lake-forming" should read --(lake-forming--.
Line 13, "Black 1." should read --Black 1).--.
Line 18, "oxice" should read --oxide--.
Line 38, "sibilite," should read --sibility,--.
Line 40, "diacrboxylic" should read --dicarboxylic--.

COLUMN 17

Line 44, "$\approx 13\times10^{4}$." should read -- $\approx 13\times10^{4}$,--.
Line 45, "10:" should read --10,000--.

UNITED STATES PATENT AND TRADEMARK OFFICE
CERTIFICATE OF CORRECTION

PATENT NO. : 5,219,947

DATED : June 15, 1993

INVENTOR(S) : SATOSHI YASUDA, ET AL.

It is certified that error appears in the above-identified patent and that said Letters Patent is hereby corrected as shown below:

COLUMN 21

Line 59, "SYNTEHSIS" should read --SYNTHESIS--.

COLUMN 22

Line 8, "styrene-o-methylstyrene" should read --styrene-α-methylstyrene--.
Line 49, "Tg = 57°C. The" should read --Tg = 57°C. ¶ The--.

COLUMN 23

Line 14, "oh" should read --on--.

COLUMN 25

Line 20, "ΔG=2%," should read --ΔG=2%.--.
Line 22, "(NP-5540." should read --(NP-5540--.

COLUMN 28

Line 68, "o-methylstyrene" should read --α-methylstyrene--.

COLUMN 29

Line 7, "o-methylstyrene" should read --α-methylstyrene--.
Line 16, "o-methylstyrene" should read --α-methylstyrene--.
Line 29, "SYNTEHSIS" should read --SYNTHESIS--.

--

UNITED STATES PATENT AND TRADEMARK OFFICE

CERTIFICATE OF CORRECTION

PATENT NO. : 5,219,947

DATED : June 15, 1993

INVENTOR(S) : SATOSHI YASUDA, ET AL.

It is certified that error appears in the above-identified patent and that said Letters Patent is hereby corrected as shown below:

COLUMN 30

Line 3, "SYNTEHSIS" should read --SYNTHESIS--.
Line 24, "SYNTEHSIS" should read --SYNTHESIS--.
Line 37, "is" should read --in--.

COLUMN 31

Line 19, "(1.2-1.3" should read --1.2-1.3--.

COLUMN 32

Line 7, "volume average" should read --volume-average--.

COLUMN 35

TABLE 5, "Example" should read --Comparative Example--.
Line 50, "THF soluble" should read --THF-soluble--.

COLUMN 36

Line 18, "$10.2\times10^{3, 35\times103}$," should read --$10.2\times10^{3}$, $35\times10^{3}$,--.

COLUMN 39

Line 11, "104" should read --$10^{4}$--.

COLUMN 40

Line 63, "µmount" should read --amount--.

UNITED STATES PATENT AND TRADEMARK OFFICE

CERTIFICATE OF CORRECTION

PATENT NO. : 5,219,947

DATED : June 15, 1993

INVENTOR(S) : SATOSHI YASUDA, ET AL.

It is certified that error appears in the above-identified patent and that said Letters Patent is hereby corrected as shown below:

COLUMN 41

Line 57, "steam" should read --stream--.

COLUMN 42

Line 9, "oh" should read --on--.

COLUMN 44

Line 8, "is" should read --it--.
Line 26, "of" should read --of the--.

Signed and Sealed this

Twenty-fourth Day of May, 1994

Attest:

BRUCE LEHMAN

Attesting Officer

Commissioner of Patents and Trademarks